(12) United States Patent
Glimm

(10) Patent No.: US 10,917,601 B2
(45) Date of Patent: Feb. 9, 2021

(54) TRACKER, SURVEYING APPARATUS AND METHOD FOR TRACKING A TARGET

(71) Applicant: Trimble Jena GmbH, Jena (DE)

(72) Inventor: Andreas Glimm, Weimar (DE)

(73) Assignee: Trimble Jena GmbH, Jena (DE)

( * ) Notice: Subject to any disclaimer, the term of this patent is extended or adjusted under 35 U.S.C. 154(b) by 0 days.

(21) Appl. No.: 16/595,158

(22) Filed: Oct. 7, 2019

(65) Prior Publication Data

US 2020/0128201 A1   Apr. 23, 2020

(30) Foreign Application Priority Data

Oct. 17, 2018 (EP) .................................... 18200906
Oct. 17, 2018 (EP) .................................... 18200908
Feb. 6, 2019 (EP) .................................... 19155706

(51) Int. Cl.
*H04N 5/378* (2011.01)
*G01C 15/00* (2006.01)
*H04N 5/345* (2011.01)

(52) U.S. Cl.
CPC ........... *H04N 5/378* (2013.01); *G01C 15/002* (2013.01); *H04N 5/3454* (2013.01)

(58) Field of Classification Search
CPC .... H04N 5/378; H04N 5/3454; G01C 15/002; G01C 1/04; G01S 17/08
See application file for complete search history.

(56) References Cited

U.S. PATENT DOCUMENTS

2008/0116354 A1\* 5/2008 Kirschner .............. G01C 1/04
250/208.1

FOREIGN PATENT DOCUMENTS

EP   0 661 519 A1   7/1995
EP   0661519 A1 \*  7/1995   ............... G01C 1/04
(Continued)

OTHER PUBLICATIONS

Extended European Search Report for Application No. 19155706.5, dated Jul. 10, 2019, 11 pages.

*Primary Examiner* — Howard D Brown, Jr.
*Assistant Examiner* — Tyler B Edwards
(74) *Attorney, Agent, or Firm* — Kilpatrick Townsend & Stockton LLP

(57) ABSTRACT

The present invention relates to a tracker and a surveying apparatus comprising the tracker, which improve the reliability of tracking a target. The tracker comprises a an image sensor arrangement having an imaging region composed of a plurality of pixels arranged in a matrix of columns and rows. The imaging region is arranged to take an image of a scene including the target. A controller receives or generates a timing signal indicating a time duration during which an illumination unit is switched on and off, controls the imaging region to take an image of the scene when the illumination unit is switched on, and reads out a subgroup of neighboring columns or rows constituting a stripe window of the imaging region so that an image section including the target is obtained, controls the imaging region to take another image of the scene when the illumination unit is switched off, and reads out another subgroup of neighboring columns or rows constituting another stripe window of the imaging region so that another image section including the target is obtained, and calculates a difference image section by determining a difference between the pixel values of the pixels of the image section and the other image section.

15 Claims, 13 Drawing Sheets

(56) References Cited

FOREIGN PATENT DOCUMENTS

EP 1 422 498 A2 5/2004
EP 2 722 645 A2 4/2014

* cited by examiner

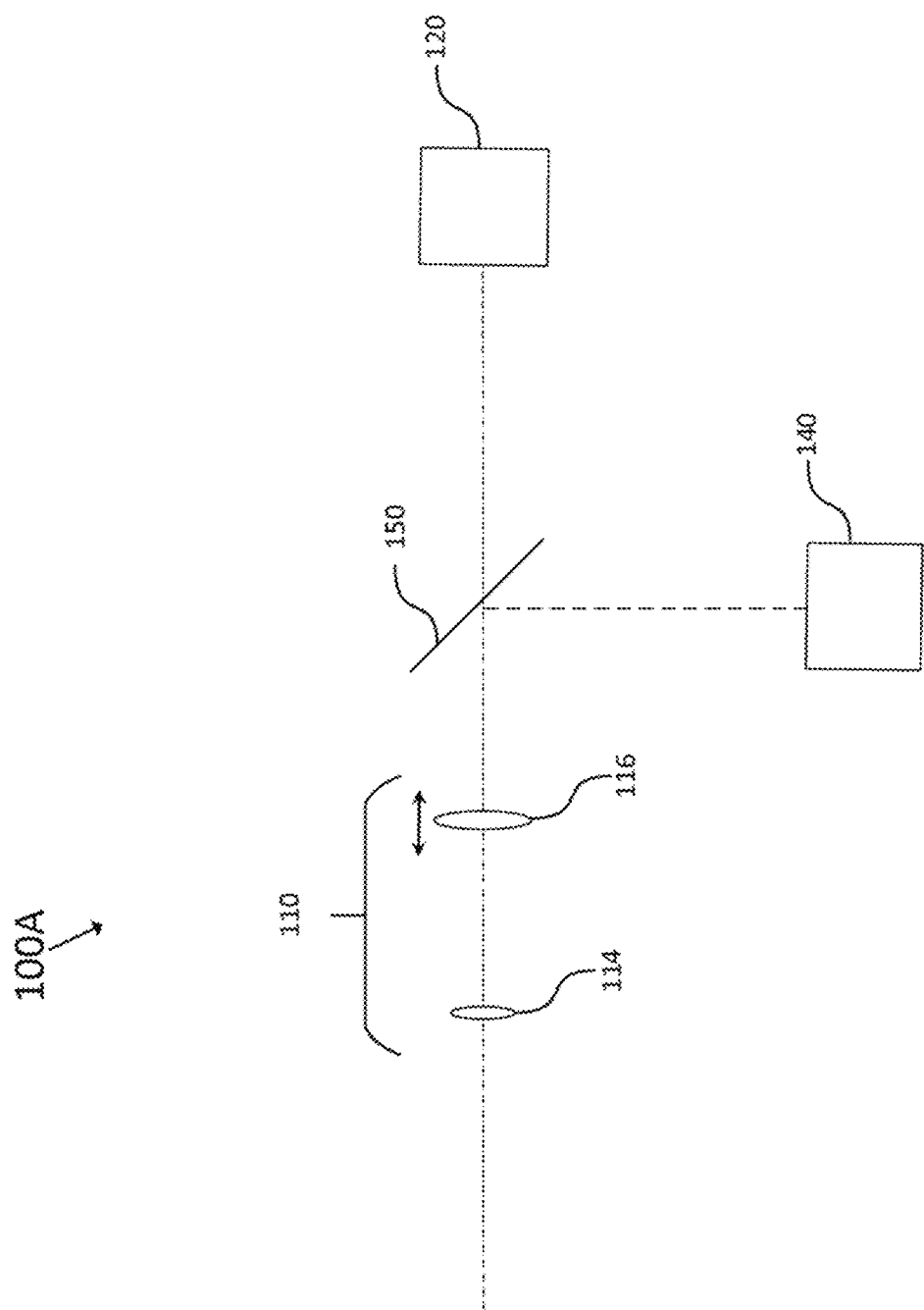

Time to get a difference image section

TRACKER, SURVEYING APPARATUS AND METHOD FOR TRACKING A TARGET

CROSS-REFERENCE TO RELATED APPLICATIONS

The present application claims priority to EP Application Nos. 19155706.5, filed Feb. 6, 2019; 18200908.4, filed Oct. 17, 2018; and 18200906.8, filed Oct. 17, 2018, the contents of each of which are incorporated herein by reference in their entirety for all purposes.

FIELD OF THE INVENTION

The present invention relates to a tracker and a surveying apparatus comprising the tracker as well as a method for tracking a target, and in particular, to a tracker having an imaging region with a plurality of pixels on an image sensor arrangement.

BACKGROUND

Optical instruments, such as geodetic or surveying instruments or apparatuses are commonly used for measuring a position of an object to obtain information, such as horizontal and vertical angles and distance. Newer instruments are often provided with a tracker, a.k.a. tracking unit or system, and an electronic imaging device, e.g. a camera, to acquire digital images of the object.

A conventional surveying instrument comprises a telescope system for sighting an object which can then be imaged on a camera behind the telescope system. Further, such an instrument may comprise a distance measurement unit to measure a distance to the object sighted by the telescope system. The viewing angle of the telescope system is preferably very small, e.g. 1 to 2 degrees, and a user has to position the surveying instrument and adjust the optics of the telescope system so that the object to be sighted and to be measured is exactly in the small field of view of the telescope system and optimally on the optical axis of the telescope system, e.g. to measure a distance to the object.

However, in certain cases the object may move so that the user has to readjust the instrument each time anew before sighting the object and/or measuring the distance to the object.

Recently, surveying instruments with tracking systems have been proposed to automatically follow the position of a moving target, i.e. an object. For example, a laser tracker comprising a laser beam may be used to track an object. Thereby, a pivotable mirror may be used to deflect the focused laser beam in the direction of the object and the direction may then be recorded using the angles of the mirror position, for example for changing the optical axis of the instrument for distance measurement.

However, tracking a target is difficult and usually requires that a focused laser beam or other directed radiation hits and is reflected from a reflector at the target back to the tracker. It can be hard to meet this condition, especially when the target is moving quickly and/or when operating in a bright environment with a lot of background light and/or additional other reflections from the sun or other light sources.

It is also possible that the reflector (reflective target) when moving becomes temporarily occluded by an obstacle. This would also render tracking temporarily impossible leading to a target loss, or the tracker may get confused and erroneously consider reflections by the sun or other light sources as reflections of the target reflector.

In one example, target tracking may be performed with a camera sensor, e.g. in the wide-VGA-format, which takes two images of a certain range of a scene, wherein one image is made with a flashed illumination, e.g. with infra-red (IR)-light, and another image without illumination. When subtracting the image information of the two images, a difference image can be obtained which optimally shows only the illuminated reflectors in the scene, such as prisms, cat eyes or reflective foils as potential targets.

However, due to the movement of a target or the movement of other light emitting/reflecting elements, e.g. moving sun reflections or other strong light sources, and thus different positions of the target or the emitting/reflecting elements in the one and the other image, artefacts may occur because the images are taken at different times. To recognize direction and amount of movement of the real target with high update rates and to avoid artefacts it is important to minimize the time between taking the two images. The minimum time is usually defined by the read out time of the image sensor, in this example the camera sensor, and takes for an image sensor, like the wide-VGA CMOS Digital Image Sensor MT9V034 from Aptina about 16 ms. This time duration is too long for a lot of scenarios in which the target or other emitting/reflecting elements move quickly in the scene.

One possibility for some scenarios may be to use binning modes or smaller areas of interests, but the benefit is not so huge. Another possibility is to use two camera sensors each taking an image directly after each other and carrying the read out after taking the two images. This method not only requires more hardware but has the additional disadvantage that the two camera sensors and optical paths have no identical behavior due to different sensitivities, blind or hot pixel in the camera sensors and unbalanced beam splitter quality in the optical paths. Accordingly, artefacts are generated. Further, when using two camera sensors, the update rate of target position information is at most only doubled.

In a target search difference images are taken from the whole scene in stop and go mode until all interesting sectors are scanned. Due to the long time between taking two images, the camera sensor has to stand still for quite some time for every difference image. As a result, a lot of time is wasted.

SUMMARY

Therefore, there is a need to improve the reliability of tracking a target and/or to decrease the search time needed by a tracker when searching for a target.

According to an embodiment, a tracker of a surveying apparatus for tracking a target comprises an image sensor arrangement having an imaging region composed of a plurality of pixels arranged in a matrix of columns and rows, e.g. vertical and horizontal lines of a sensor chip, wherein the imaging region is arranged to take an image of a scene including the target. The tracker further comprises a controller configured to receive or generate a timing signal, the timing signal indicating a time duration during which an illumination unit illuminating the target in the scene is switched on and off. The controller is further configured to control the imaging region to take an image of the scene when the timing signal indicates that the illumination unit is switched on, and read out a subgroup of neighboring columns or rows constituting a stripe window of the imaging region so that an image section including the target is obtained, and configured to control the imaging region to take another image of the scene when the timing signal indicates that the illumination unit is switched off, and read out another subgroup of neighboring columns or rows constituting another stripe window of the imaging region so that another image section including the target is obtained. The controller is still further configured to calculate a difference image section by determining a difference between the pixel values of the pixels of the image section and the other image section. The tracker further comprises an output unit configured to output the difference image section so as to identify the target in the difference image section. Accordingly, the sensitivity in detecting and tracking a target is increased, since, for example, bright or reflecting surfaces which could be confused with a target can be largely eliminated in the difference image section. In particular, using instead of two full images two image sections each being a part of a full image and having the size of the stripe window allows the time between taking a first image and second image to be set short. As a result, tracking can be performed more reliably, decreasing target losses when tracking a target and decreasing the time in finding a target.

According to an advantageous embodiment, the imaging region of the image sensor arrangement is adapted so that more pixels are arranged in the direction of the rows than in the directions of the columns and the imaging region is preferably arranged in the tracker so that the direction of the rows corresponds to the vertical direction, i.e. a vertical direction of the observed scene. For example, a camera sensor, such as the above-mentioned wide-VGA CMOS Digital Image Sensor having a landscape format and a direction of fast read out of the sensor along the direction of the rows (the horizontal direction in landscape format) can be rotated by 90° so as to be used as image sensor arrangement allowing quick read out of the pixels along the rotated rows (the vertical direction in the portrait format after rotation). Accordingly, a simple off-the-shelf camera chip can be effectively used as the image sensor arrangement in a tracker or tracker receiver to scan an enlarged vertical field of view.

According to an advantageous embodiment, the number of columns or rows of a stripe window is between one column or row to half of all columns or rows, preferably a twentieth to a third of all columns or rows of the imaging region. Accordingly, the read out time can be reduced by at least half the normal time needed to read out all pixels of the imaging region.

According to an advantageous embodiment, a stripe window of a first size is used in a target search mode and a stripe window of a second size is used in a target tracking mode, wherein the first size and the second size are different. Accordingly, the size of the stripe window can be flexibly adjusted based on its intended use. For example, the first size has more columns or rows than the second size so that difference image sections can be obtained quicker in the target tracking mode than in the target search mode. Thus, once a target is found in the search mode, it can be quickly tracked.

According to an advantageous embodiment, the controller is further configured to determine the position of the target inside the stripe window, and if the determined position of the target does not coincide with a position on the center line of the stripe window, the stripe window is enlarged and/or shifted in the imaging region and/or the image sensor arrangement is mechanically moved so that the target is positioned closer to the center line. Accordingly, loss of target caused by the inertia of the mechanically moving tracker can be avoided.

According to an advantageous embodiment, the controller is configured, after reading out the subgroup and the other subgroup of neighboring columns or rows constituting two stripe windows, when calculating the difference image section, to correct for a movement of the tracker in the time between taking the image and the other image by taking into account an offset between the scene on the stripe window of the image and the scene on the stripe window of the other image, the offset corresponding to a shift in the scene due to the movement of the tracker. Accordingly, even movements of the tracker between taking the first image and the second image can be electronically corrected to improve the reliability of the target detection and avoid wasting time by taking images in a "stop-and-go" mode.

According to an advantageous embodiment, to correct for the movement of the tracker, the controller is configured to identify an area of pixels of the stripe window and another area of pixels of the other stripe window which correspond to the same scene so as to obtain a difference area by determining a difference between the pixel values of the pixels of the area and the other area which recorded the same scene. Accordingly, movements of the tracker between taking the first image and the second image can be corrected automatically, e.g. using the knowledge about the tracker movement speed, so as to further improve the reliability of the target detection.

According to an advantageous embodiment, the tracker comprises a tracker emitter for emitting tracking light on an optical tracker path. The tracker emitter may include the illumination unit so that the tracking light illuminates the target. Accordingly, tracking light may be provided which can be reflected by a reflective target in the scene so as to easily distinguish and detect the target.

According to an advantageous embodiment, the tracker is adapted to issue an instruction to a surveying apparatus to move the optical axis of a lens arrangement of the surveying apparatus. Accordingly, the tracker can be used to autonomously control the movement of a lens arrangement so that a surveying apparatus can automatically follow a target and take images during its movement and/or measure the distance to the target.

According to an embodiment, a surveying apparatus for surveying a target is provided comprising a lens arrangement including at least one movably arranged focus lens element for focusing to sight a target; an imaging unit configured to obtain an image of at least a part of the target; and the tracker described above. Accordingly, a surveying apparatus may benefit from the advantages of the above described tracker.

According to an advantageous embodiment, the surveying apparatus further comprises a beam splitter/combiner configured to combine a part of the optical imaging path of the imaging unit and a part of the optical tracker path of the tracker so that the optical axis of the imaging unit and the optical axis of the tracker are at least coaxially arranged with the optical axis of the lens arrangement between the lens arrangement and the beam splitter/combiner. Accordingly, a compact optical setup is achieved in which the optical paths of the tracker and the imaging unit are combined so that the same lens arrangement is used for both.

According to an advantageous embodiment, the surveying apparatus further comprises a distance measuring unit configured to measure a distance to the target along the optical axis of the distance measuring unit. Accordingly, a distance to a target can be measured while the target is tracked.

According to an advantageous embodiment, the beam splitter/combiner is further configured to combine the part of the optical tracker path of the tracker, the part of the optical imaging path of the imaging unit and a part of the optical distance measuring path of the distance measuring unit so that the optical axis of the tracker, the optical axis of the imaging unit and the optical axis of the distance measuring unit are at least coaxially arranged with the optical axis of the lens arrangement between the lens arrangement and the beam splitter/combiner. Accordingly, a compact optical setup is achieved in which the optical paths of the distance measuring unit, the tracker and the imaging unit are combined so that the same lens arrangement is used.

According to an embodiment, a method for tracking a target is provided, which comprises taking an image of a scene including the target on an imaging region of an image sensor arrangement, which is composed of a plurality of pixels arranged in a matrix of columns and rows; and taking another image of a scene including the target on the imaging region. When receiving a timing signal indicating a time duration during which an illumination unit illuminating the target in the scene is switched on and off, the imaging region is controlled to take the image of the scene when the timing signal indicates that the illumination unit is switched on, and a subgroup of neighboring columns or rows constituting a stripe window of the imaging region is read out so that an image section including the target is obtained, and the imaging region is further controlled to take the other image of the scene when the timing signal indicates that the illumination unit is switched off, and another subgroup of neighboring columns or rows constituting another stripe window of the imaging region is read out so that another image section including the target is obtained. The method further comprises calculating a difference image section by determining a difference between the pixel values of the pixels of the image section and the other image section, and outputting the difference image section so as to identify the target in the difference image section. Accordingly, the same advantages as mentioned above can be achieved; in particular, tracking can be performed more reliably, decreasing target losses when tracking a target and decreasing the time in finding a target.

According to an embodiment, a program is provided including instructions adapted to cause data processing means to carry out the above method.

According to another embodiment, a computer readable medium is provided, in which the program is embodied, where the program is to make a computer execute the above methods.

According to another embodiment, a surveying system is provided comprising a remote control unit and the above described surveying apparatus, wherein the surveying apparatus comprises a communication interface to communicate with the remote control unit.

BRIEF DESCRIPTION OF THE DRAWINGS

FIG. 1A illustrates elements of a surveying apparatus.

DETAILED DESCRIPTION

Figure 1B:
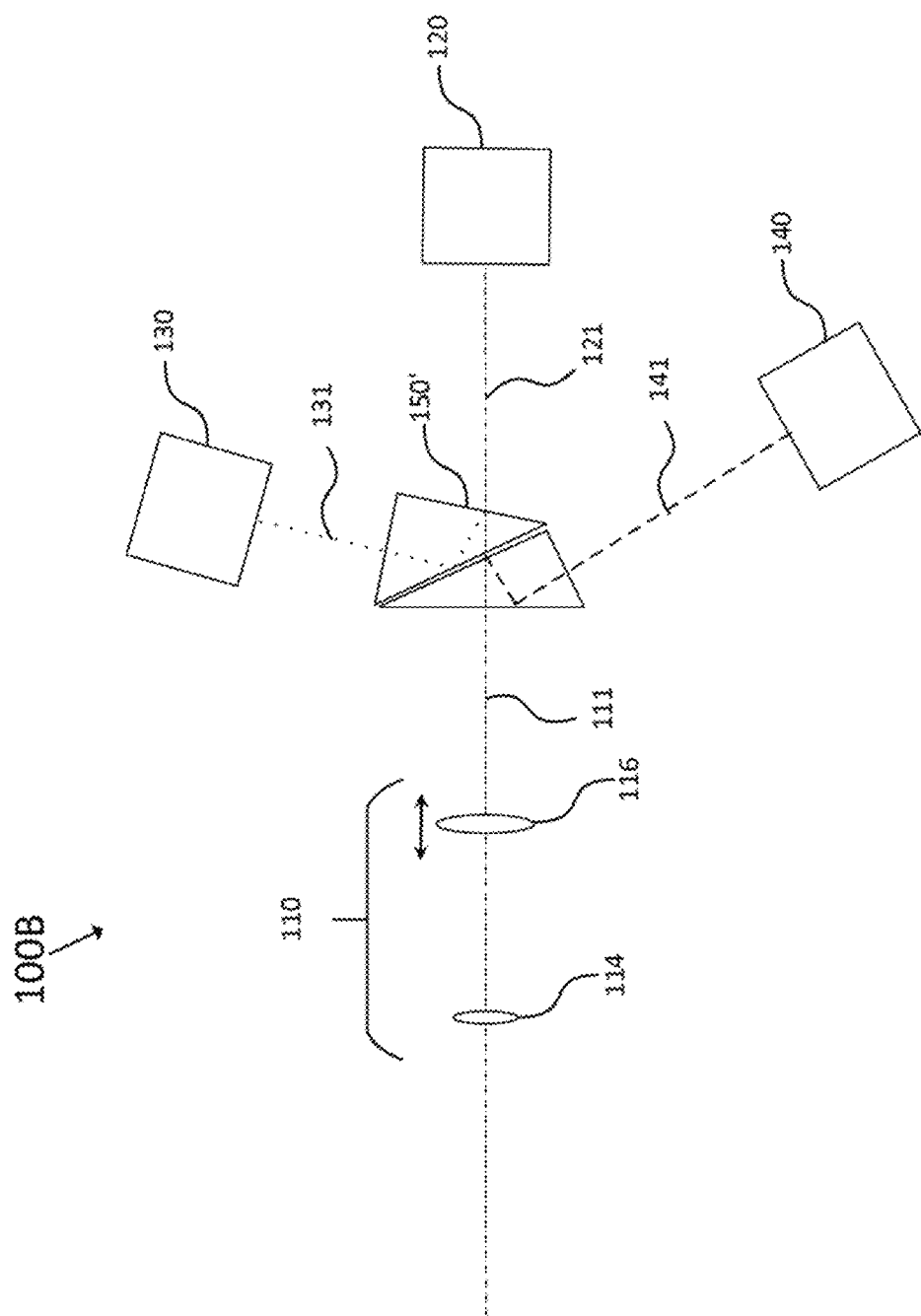
FIG. 1B illustrates elements of a surveying apparatus according to an embodiment.

Preferred embodiments of the invention are described with reference to the figures. It is noted that the following description contains examples only and should not be construed as limiting the invention. In the following, similar or same reference signs indicate similar or same elements or functions.

Embodiments of the invention generally relate to trackers having an image sensor arrangement with a plurality of pixels so as to provide an imaging region. By taking two images in different illumination states, a difference image section can be generated using the tracker. In particular, the tracker is designed so that after taking a first and second image of a scene including a target, pixels constituting a stripe window of the imaging region are read out so that a first and second image section including the target are obtained. By reading out only a subgroup of pixels of only selected columns or rows, pixels of the other (non-selected) columns or rows are not read out, which greatly speeds up the read out process. As a result, the tracker can quickly generate a difference image section from the first and second image section to identify the target. A tracker according to an embodiment of the invention is described in more detail in FIG. 4.

A calculated difference image section obtained from two image sections (each being a part of an image and having the size of the stripe window) preferably shows only reflectors like prisms, cat eyes or reflective foils as potential targets while suppressing reflections and other light from other sources. To recognize direction and amount of movement of the target with a high update rate and to avoid artefacts caused by moving sun reflections or other strong light sources, it is important to minimize the time between taking the two images. This can be done by reducing the read out time of the image sensor arrangement by limiting the pixels to be read out (real windowing). For example, if a sensor like the above-mentioned wide-VGA sensor MT9V034 is used, for which about 16 ms are usually needed to read out the pixels, the read out time can be reduced to 1.6 ms if only a tenth of the rows (or columns) are read out. Using the tracker reading out only pixels of a stripe window as presented herein, the time between taking two images can be reduced far below the normal read out time.

In the following, first different optical setups of surveying apparatuses are discussed, most of which include a tracker, wherein details of the trackers of different embodiments are discussed in the context of the relevant figures.

FIG. 1A illustrates elements of a surveying apparatus 100A. The surveying apparatus 100A comprises a lens arrangement 110, an imaging unit 120, a distance measuring unit 140 and a beam splitter/combiner 150.

The lens arrangement 110 is provided to sight an object which is a target, such as a reflector. The optical arrangement 110 includes at least one movably arranged focus lens element 116 for focusing so as to sight the object. For example, the focus lens element may be an individual or compound focusing lens which is moved manually or automatically to produce in focus/out of focus images of the object which may be viewed through an ocular constituting a simple imaging unit. The lens arrangement 110 may be part of a telescope known in the art of surveying, and may comprise several optical lenses, such as lenses 114 and 116, so as to enable focusing and/or zooming. In one example, the lens arrangement 110 is attached to a positioning unit so as to change the direction of the optical axis of the lens arrangement which will be discussed in more detail with respect to FIG. 6.

The imaging unit 120 is configured to obtain an image of at least a part of the object sighted by the lens arrangement 110. The imaging unit 120 may be a simple lens or an ocular, a.k.a. eyepiece, so that an image can be obtained in the eye of the user. Alternatively, the imaging unit 120 may be a combination of an electronic imaging device, a microdisplay and an ocular so that an image can be recorded and viewed conventionally by eye through an ocular. Preferably the imaging unit 120 is an electronic imaging device, for example, a two-dimensional array of sensor elements capable of generating image information with a number of pixels generally corresponding to the number of elements of the array, such as a charge-coupled device (CCD) camera or a complementary metal-oxide semiconductor (CMOS) camera. Such a sensor array may be composed of 1000×1000 sensor elements or more to generate digital images with $10^6$ image pixels (1 megapixel) or more. However, also smaller sensor arrays are feasible, for example, composed of 480× 750 sensor elements. Alternatively, the sensor array may be composed of avalanche photodiodes (APD) forming an APD array.

The distance measurement unit 140 is configured to measure a distance to the object along the optical axis of the distance measuring unit 140, which constitutes an optical measurement axis. For example, the distance measurement unit 140 uses an electronic distance measurement (EDM) to obtain measurement values about the distance. In one example, the distance measurement unit 140 includes a coherent light source, such as an infrared laser or another suitable laser, e.g. emitting in a red-wavelength range, and preferably a fast reflector-less working EDM. Conventionally collimated light is sent out in a radial direction from the surveying apparatus 100A to perform a distance measurement by using a pulse method or phase method as known in the art. Further, the intensity of a received EDM-Signal, i.e. the back-reflected signal of an electro-optical distance measurement, could also be used to obtain information about the distance to the reflecting object. A preferred embodiment of a distance measuring unit 140 will be discussed with respect to the distance measuring unit 240 in FIG. 2.

In FIG. 1A, a beam splitter/combiner 150 is provided and configured to combine a part of the optical imaging path of the imaging unit 120 and a part of the optical distance measuring path of the distance measuring unit 140 so that the optical axis of the imaging unit 120 and the optical axis of the distance measuring unit are coaxially arranged with the optical axis of the lens arrangement at least between the lens arrangement 110 and the beam splitter/combiner 150.

An optical axis may be regarded as an imaginary line that defines the path along which light propagates through the system, up to a first approximation. For a system composed of simple lenses and mirrors, an optical axis passes through the center of curvature of each surface, and coincides with the axis of rotational symmetry. The optical path may be regarded as the path that light takes when traversing an optical system, such as the lenses of the lens arrangement 110. The optical (beam) path is usually limited by a three-dimensional volume having the optical axis as an axis of rotational symmetry, in which light may travel. An example is provided with respect to FIG. 5 which is discussed below in more detail.

The optical axis of the imaging unit 120 is shown by the dot-and-dash line and the optical axis of the distance measuring unit 140 is shown by the dashed line. No preferred direction is given by the lines (optical reciprocity) but it is understood that light to be imaged on the imaging unit 120 travels from left to right. The beam splitter/combiner 150 combines these lines to obtain an overlap of the optical axes on the left part of the beam splitter/combiner 150 in FIG. 1A. Since these axes are parallel and overlapping, i.e. coaxial, to each other, and additional parallel and overlapping to the optical axis of the lens arrangement 110, they are also regarded coaxially arranged with respect to the optical axis of the lens arrangement 110.

In particular, the optical setup and especially the beam splitter/combiner 150 are chosen such that the optical axis of the lens arrangement 110 corresponds to the overlapping optical axes of the imaging unit 120 and the distance measuring unit 140 between the beam splitter/combiner 150 and the lens arrangement 110 as well as along the lens arrangement 110 so that light traveling in the respective optical paths is affected by the lenses 114 and 116 of the lens arrangement. Since the optical axes of the distance measuring unit 140 and the imaging unit 120 partly overlap, also the optical paths, i.e. the optical imaging path and the optical distance measuring path, of these units partly overlap when being combined by the beam splitter/combiner 150. Alternatively, the distance measuring unit 140 may be replaced by a tracker, such as tracker 130, which will be explained in more detail below with respect to FIG. 1C.

Figure 1C:
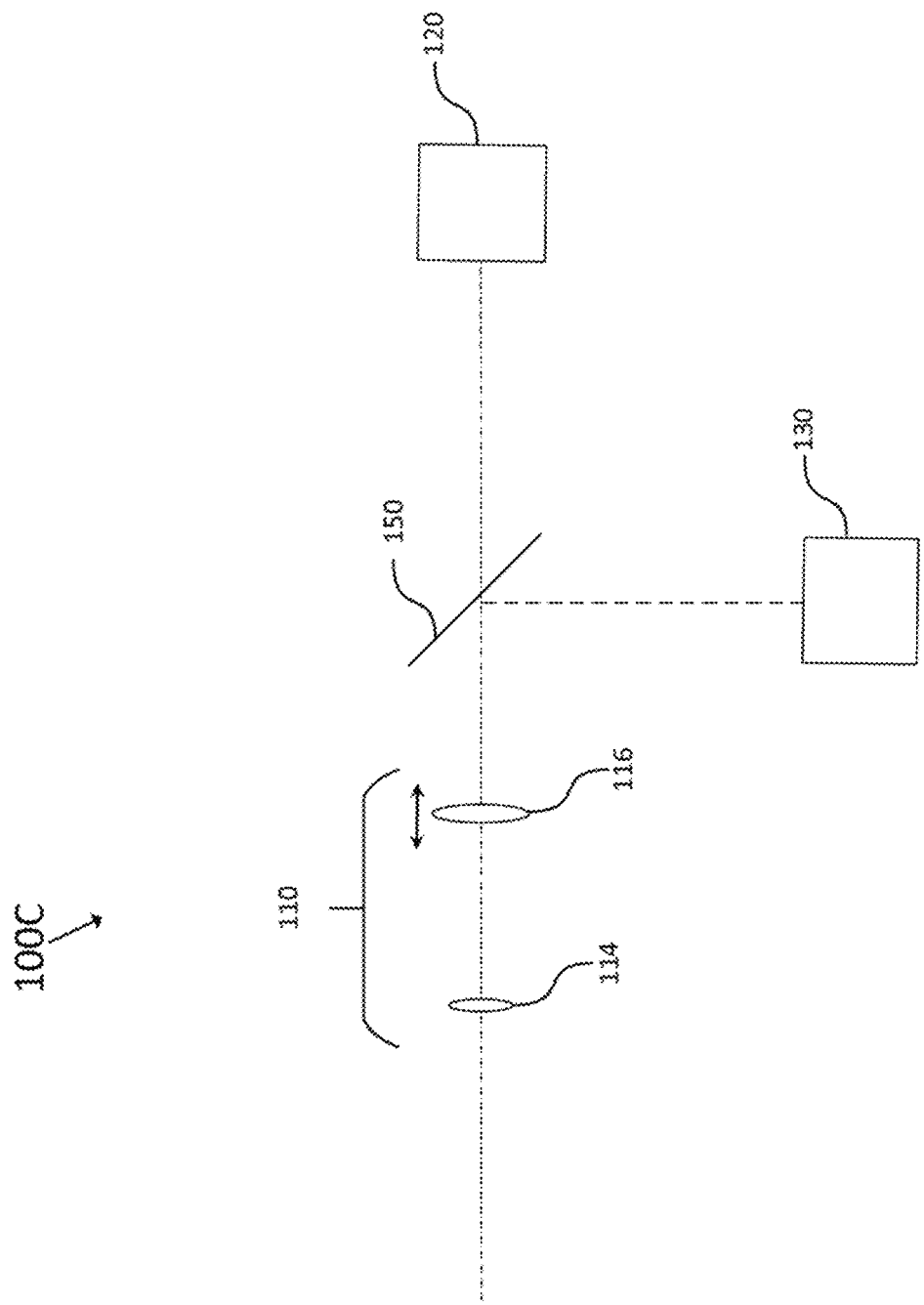
FIG. 1C illustrates elements of a surveying apparatus according to another embodiment.

In the apparatuses of FIGS. 1A, 1B, 1C as well as 2, 3 and 5, the center of the two dimensional array of sensor elements as imaging unit and the center of the tracking unit, i.e. tracker, do not need to coincide with the optical axis of the lens arrangement 110. For example, in a calibration step, the center can be defined on the two dimensional array of sensor elements as the point where the optical axis coincides with the array.

It is understood that a coaxial arrangement of two or more optical axes is basically a theoretical assumption, since in practice the optical axes will usually not exactly overlap and point in the exact same direction but will overlap within some small error range. Thus, for ease of explanation we assume axes deviations of less than +/−0.2° still as coaxial. Typical alignment errors are in the order of +/−0.1° which can be corrected later in calibration by software.

Looking at FIG. 1A from a different perspective, according to the optical reciprocity principle, light originating on the left side in FIG. 1A, and thus entering the lens arrangement 110 from the left, will be split by the beam splitter/combiner 150. Therefore, describing that an optical path is split into two optical paths by the beam splitter/combiner (looking from left to right) is technically the same as describing that two optical paths are combined by the beam splitter/combiner (looking from right to left).

In a simple case, a semi-transparent mirror may be used as beam splitter/combiner dividing the incoming light into two parts, e.g. 50:50, one part reaching the imaging unit 120 and the other part reaching the distance measuring unit 140. Undesired distance measuring light in the imaging channel may then be filtered before it hits the imaging unit 120. In practice, however, a dichroic mirror or prism, i.e. a mirror or prism which is transparent for one wavelength range and reflective for the other, is used. This wavelength selectivity may be achieved with dichroic filters/films using the principle of thin-film interference. Using a dichroic mirror or dichroic prism thus allows using a large percentage of reflected and transmitted light, respectively.

Accordingly, depending on the light direction and the wavelength, in addition to its configuration to combine light beams, the beam splitter/combiner 150 is also configured to split light reflected from the object traversing the lens arrangement in imaging light along the optical imaging path and in distance measuring light along the optical distance measuring path.

It is clear from the above that the optical paths and optical axes are independent of the light traveling direction so that "splitting" and "combining" is merely used to better explain the optical layout. In particular, the imaging unit in these examples only receives light and does not send out any light so that the beam splitter/combiner does not combine light from the imaging unit and the distance measuring unit but is configured with an optical function that could do so, since light entering the surveying apparatus through the lens arrangement is split in different channels by the beam splitter/combiner. In other words, the optical function of the beam splitter/combiner is to combine different paths from its right side to overlap on its left side.

In one example, a laser diode of the distance measuring unit 140 may emit light in the red range of approximately 660 nm (or 635 nm) and the imaging unit 120 may image a scenery including an object reflecting visible wavelengths. Accordingly, if a dichroic mirror with a cut-off wavelength of approximately 620 nm, i.e. wavelengths larger than 620 nm are reflected, is provided (alternatively a notch filter blocking light around 635 nm), distance measuring and imaging may be achieved in separate channels with hardly any loss in intensity. Using a dichroic prism design further allows to glue a camera chip of an imaging unit directly onto parts of the prism so that a highly compact structure is achieved which is largely insensitive to temperature changes and external shocks while mechanic components for attaching and aligning a camera chip can be saved.

Additional reliability of the measurements of the surveying apparatus can be achieved if the lens 116 in the lens arrangement 110 facing the beam splitter/combiner has a convex side, e.g. a plano-convex or a bi-convex lens, which faces the beam splitter/combiner. As a result, reflections from this lens of distance measuring light from the distance measuring unit 140 may not be reflected back to the distance measuring unit 140 so as to avoid crosstalk which could lead to the detection of signals not coming from the actual target (object). Furthermore, anti-reflection coatings on the lenses of the lens arrangement may also reduce crosstalk. When using a prism as the beam splitter/combiner 150, an intermediate focus should be placed outside and not inside the prism and the surface(s) of the prism on which light is incident may be slightly tilted with respect to an orthogonal direction so that light is not fully orthogonally incident thereon. Furthermore, air gaps between individual prisms for total reflection can be provided where appropriate.

In FIG. 1B, an embodiment of a surveying apparatus is provided which further builds on the surveying apparatus 100A of FIG. 1A. Specifically, the surveying apparatus 100B comprises the same elements as the surveying apparatus 100A and additionally comprises a tracker 130.

The tracker 130 is configured to track the object, e.g., a triple prism reflector as target, by using preferably infrared light at a wavelength of 850 nm (or 810 nm) as illumination light. As directly understandable from FIG. 1B, the beam splitter/combiner 150 of FIG. 1A needs some modification to combine/split the three beam paths of the tracker 130, the imaging unit 120 and the distance measuring unit 140, respectively. Thus, the beam splitter/combiner 150' is configured in FIG. 1B to combine a part of the optical tracker path of the tracker 130, a part of the optical imaging path of the imaging unit 120 and a part of the optical distance measuring path of the distance measuring unit 140 so that the optical axis of the tracker, the optical axis of the imaging unit and the optical axis of the distance measuring unit are coaxially arranged with the optical axis of the lens arrangement 110 at least between the lens arrangement and the beam splitter/combiner 150'. Thus, the lens arrangement 110 is shared by the tracking, distance measuring and imaging functions.

In more detail, in FIG. 1B, the optical axis of the tracker 130 is shown by the dotted line 131, the optical axis of the imaging unit 120 is shown by a dot-and-dash line 121 and the optical axis of the distance measuring unit 140 is shown by the dashed line 141. In FIG. 1B, it is schematically shown how light of these optical axes is reflected and transmitted by the beam splitter/combiner 150' to coincide with the optical axis 111 of the lens arrangement 110.

The prism system shown in FIG. 1B is a multi-channel prism. In particular, the prism system comprises two prisms having wedge shapes. In a preferred embodiment, the beam splitter/combiner 150' comprises at least two wedge shaped prisms and wavelength selective surfaces. A wavelength selective surface is any surface which reflects different wavelengths differently. In the above example of the dichroic mirror (or similar dichroic prism), the dichroic mirror (or dichroic prism) may also comprise a wavelength selective surface. The more optical paths need to be combined, the more prisms or mirrors (or combinations thereof) need to be provided. Thus, in a preferred embodiment having three functional modules, such as tracker 130, imaging unit 120 and distance measuring unit 140, the prism system is made up of two dichroic prisms having dichroic mirror-like surfaces.

The skilled person realizes that instead of using preferably the two dichroic prisms shown in FIG. 1B also two dichroic mirrors may be used. Therefore, similar to FIG. 1A, the optical axes of the tracker, distance measuring unit and imaging unit can be coaxially arranged with the optical axis of the lens arrangement 110 on the left side of the beam splitter/combiner 150'.

In one embodiment, the tracker 130 comprises a tracker receiver and a tracker emitter. For example, the tracker emitter is disposed together with the tracker receiver in the same tracker unit 130. In this example, the tracker emitter emits tracking light on the optical tracker path, i.e. along the optical axis 131 and 111. Details of such an arrangement are provided with respect to FIG. 5.

Figure 4:
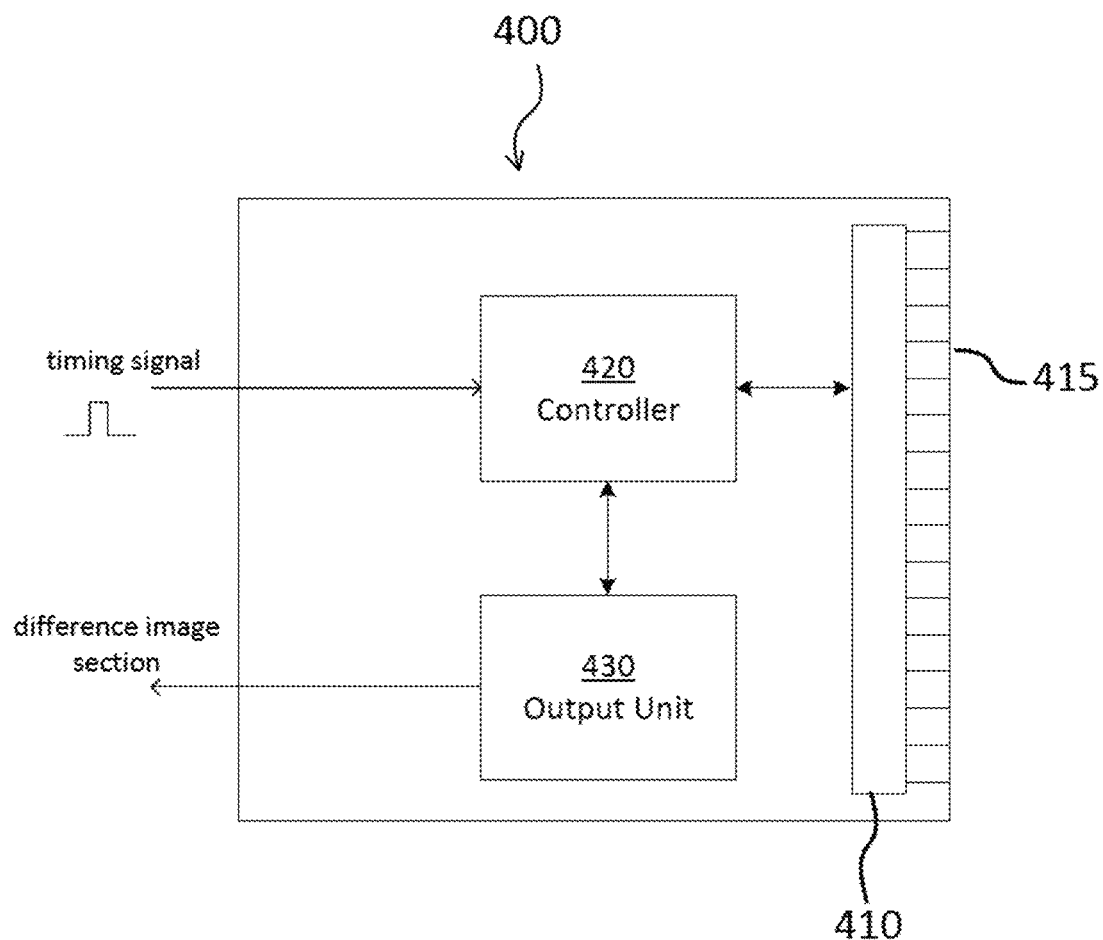
FIG. 4 illustrates elements of a tracker according to an embodiment.

In one embodiment, the tracker 130 comprises, as discussed in detail with respect to FIG. 4, an image sensor arrangement, a controller and an output unit and receives a part of back-reflected tracking light split by a beam splitter, e.g. prism cube. In this example, the tracker emitter may be placed at one end of the lens arrangement 110, for example, and may constitute a ring of LEDs around an opening of the lens arrangement. Alternatively, as discussed above, the tracker emitter may be disposed next to the tracker receiver, wherein a semi-transparent mirror, prism or similar is used to combine/split their optical paths.

The tracking light may have a wavelength in the infrared range, such as 850 nm, the distance measuring light may have a wavelength in the red range, such as 635 nm, e.g. from a laser diode or fiber laser, and the imaging unit may receive visible light below the red distance measuring light. The prism system 150' may then be provided with suitable wavelength selective surfaces to guide outgoing light to and through the lens arrangement 110 and separate incoming light to reach the three individual channels.

Accordingly, the incoming light which may comprise tracking light reflected from the object, ambient light reflected from the object as well as from other structures in the field of view of the surveying apparatus and distance measuring light reflected from the object, enters the lens arrangement 110, wherein the beam splitter/combiner 150' is configured to split this reflected light from the object (as well as other structures) traversing the lens arrangement into tracking light along the optical tracker path 131, into imaging light along the optical imaging path 121 and into distance measuring light along the optical distance measuring path 141.

In another embodiment, the surveying apparatus 100A, 100B further comprises a thermal imaging camera configured to acquire an image of at least part of the object in a wavelength range above the visible range. For example, the thermal imaging camera may be an infrared camera replacing the imaging unit 120 in FIG. 1A or 1B, or the tracker 130 in FIG. 1B. The thermal imaging camera may also be provided in addition to the three functional modules 120, 130, and 140 in FIG. 1B so that a different prism system with one more channel needs to be provided.

FIG. 1C illustrates elements of another example of a surveying apparatus 100C. The surveying apparatus 100C comprises a lens arrangement 110, an imaging unit 120, a tracker 130 and a beam splitter/combiner 150. The surveying apparatus 100C corresponds to the surveying apparatus 100A but the distance measuring unit 140 is replaced by the tracker 130, wherein specific trackers which can be used as tracker 130 are discussed below with respect to FIG. 4. In the surveying apparatus 100C the optical axis of a distance measuring unit (not shown), if included in addition to the tracker 130, may be parallel to the optical axis of the lens arrangement.

The surveying apparatus 100A, 100B or 100C may be integrated in or constituted by a video surveying instrument, such as a video theodolite or a video tachymeter, also known as a tachymeter or total station or any other kind of optical instrument used for surveying, and in particular for determining angles and/or distances to an object to derive the position of the object (target).

A tracker and several modifications thereof will be explained in more detail in the following, each of the tracker and modified trackers can be implemented in the surveying apparatuses described with respect to FIGS. 1B and 1C as well as FIGS. 2, 3, 5 and 6.

One embodiment of a tracker is depicted in FIG. 4. The tracker 400 comprises several elements, namely an image sensor arrangement 410, a controller 420 and an output unit 430. The tracker 400 of FIG. 4 may be used as tracker receiver 236 of FIG. 2, tracker receiver 336 of FIG. 3, tracker receiver 535 of FIG. 5 or tracker 630 of FIG. 6.

The image sensor arrangement 410 has an imaging region 415 composed of a plurality of pixels arranged in a matrix of columns and rows. The columns and rows may be regarded as vertical and horizontal lines of pixels, respectively. The imaging region 415 is arranged to take an image of a scene including a target. In particular, the imaging region may take a first image at a first time and a second image at a second time. Each image may include a scene including an object which constitutes the target to be tracked.

The controller 420 may be configured to receive a timing signal as illustrated in FIG. 4. Alternatively, the controller 420 may be configured to generate the timing signal itself. For example, the timing signal may be generated outside the tracker, e.g. by a controller 608 of the surveying instrument or by the remote control unit 690 of FIG. 6, discussed below. In the alternative way, the tracker controller 420 may generate the timing signal upon request from another unit or in a pre-programmed fashion itself. Clearly, there are multiple options regarding which control element is the master generating the timing signal and which control element is the slave receiving it.

The timing signal indicates a time duration during which an illumination unit illuminating the target in the scene is switched on and off, i.e. it at least indicates when the illumination unit is switched on since the on-time may be predefined so that the off-time can be implicitly known. For example, the presence of this signal may indicate when an illumination unit, such as a tracker emitter, is switched on or instructed to be switched on, and the absence of this signal may indicate when an illumination unit is switched off. By switching on and off an illumination light of a scene including a preferably reflective target, it is possible to obtain two images one with a bright, e.g. light reflecting, target and one with a dark target, i.e. no illumination light is emitted/reflected from the target. In other words, the timing signal influences the time of taking images and hence provides synchronization between image acquisition and illumination on/off time.

In more detail, the tracker controller 420 controls the imaging region 415 to take an image of the scene when the timing signal indicates that the illumination unit is switched on (or off). Once the image is taken, the controller controls the read out. For example, a read out function within the controller reads out a subgroup of neighboring columns or rows constituting a stripe window of the imaging region 415 so that an image section including the target is obtained. That is, the controller 420 reads out only a subgroup of all pixels, namely only the pixels of the neighboring columns or rows, the other pixels of the other columns or rows are not read out.

Similarly, the tracker controller 420 controls the imaging region 415 to take another image of the scene when the timing signal indicates that the illumination unit is switched off (or on), and then reads out another subgroup of neighboring columns or rows constituting another stripe window of the imaging region 415 so that another image section including the target is obtained. Each image section is only a part of the full image and has a size defined by the stripe window.

The two stripe windows defining subgroups of neighboring columns or rows have preferably the same size, as shown and explained with respect to FIGS. 8, 10 and 11. Hence, the corresponding image sections cover the same number of pixels. If the tracker 400 and the stripe window are not moved, the two image sections preferably cover the same pixels.

The pixels of the imaging region 415 may be pixels of a charge-coupled device (CCD) camera chip or a complementary metal-oxide semiconductor (CMOS) camera chip. The sensor arrays of such camera chips may be composed of 1000×1000 sensor elements or more to generate digital images with $10^6$ image pixels (1 megapixel) or more. However, also smaller sensor arrays are feasible, for example, composed of 752×480 sensor elements (pixels). Preferably a small stripe of the full image frame is used which may easily include the image of the target.

For example, image sensors with real windowing are able to decrease the read out time according to the number of selected window rows/columns. While read out of a full image frame of 752 (pixels in horizontal direction)×480 (pixels in vertical direction) of the above-mentioned wide-VGA CMOS Digital Image Sensor takes 16 ms, for a stripe-window of 752×48 it takes just 1.6 ms. The smaller usable field of view in one direction of the difference image enable much higher update rates (320 Hz compared with 32 Hz) of the position information of the target and emitting/reflecting elements.

As known in the art of CCD or CMOS camera chips, pixel responses are usually different over a chip and faulty pixels, e.g. hot pixels, may lead to always on or always off pixels. Thus, subtraction of image information of two image sections covering different pixels, e.g. because the stripe window moved, may lead to some artefacts. These artefacts may however be suppressed by calibration, e.g. by recording and knowing the response of each pixel in advance. Preferably, as mentioned above, the tracker and the stripe window are not moved when taking two images so that the two image sections cover the same pixels, as in the difference image sections shown in FIGS. 10A-10E.

According to the above, the tracker controller 420 can control the imaging region 415 to take the first image of the scene when the timing signal indicates that the illumination unit is switched on (or off), and can similarly control the imaging region 415 to take the second image when the timing signal indicates that the illumination unit is switched off (or on). Hence, the pixels of the first image recorded image information of the scene with illumination and the pixels of the second image recorded image information of the scene without illumination. The above exemplary tracker controller 420 is explained as comprising several controller functions of the tracker. However, the controller 420 does not need to be one individual unit or microprocessor. The skilled person is aware that these controller functions may as well be distributed over several control elements or individual microprocessors being in communication with each other. For example, the tracker may have a separate camera controller which is pre-programmed or instructed by a main tracker controller to read out the subgroup of neighboring columns or rows constituting the stripe window of the imaging region.

When "first" (or one image) and "second" (or another image) are used in this description, it should be understood that these terms shall not be construed to give any limitation to the specific time sequence. In other words, taking a "second image" may come in time before taking a "first image" so that the image which is taken first in time is taken while the illumination unit is switched off and the other image is taken while the illumination is on. Hence, the terms "first" and "second" are merely used to distinguish two different images which are taken at two different times.

After reading out the pixel values of the pixels corresponding to the first image section and the pixel values of the pixels corresponding to the second image section, a difference image section may be calculated. To obtain the difference image section, the controller determines a difference between the pixel values of the pixels of the first image section and the second image section. That is, by subtracting a pixel value of the first image section from a pixel value of the second image section belonging to the same or similar part of the scene, the image information of the scenes with and without illumination are subtracted leaving a difference image section, which shows only the illuminated target and eliminates other highly reflective structures in the scene which could be erroneously considered a reflective target by the tracker.

The output unit 430 then obtains the calculated difference image section from the controller 420 and outputs the difference image section so that the target can be identified in the difference image section by the user or an image processing algorithm running on a processor of a surveying apparatus, for example. Accordingly, the target may be identified in the difference image section with high accuracy.

The advantages of a difference image section over a simple difference image can be readily recognized when comparing FIGS. 7A-7C to FIGS. 8A-8C.

Figures 7A, 7B, 7C:
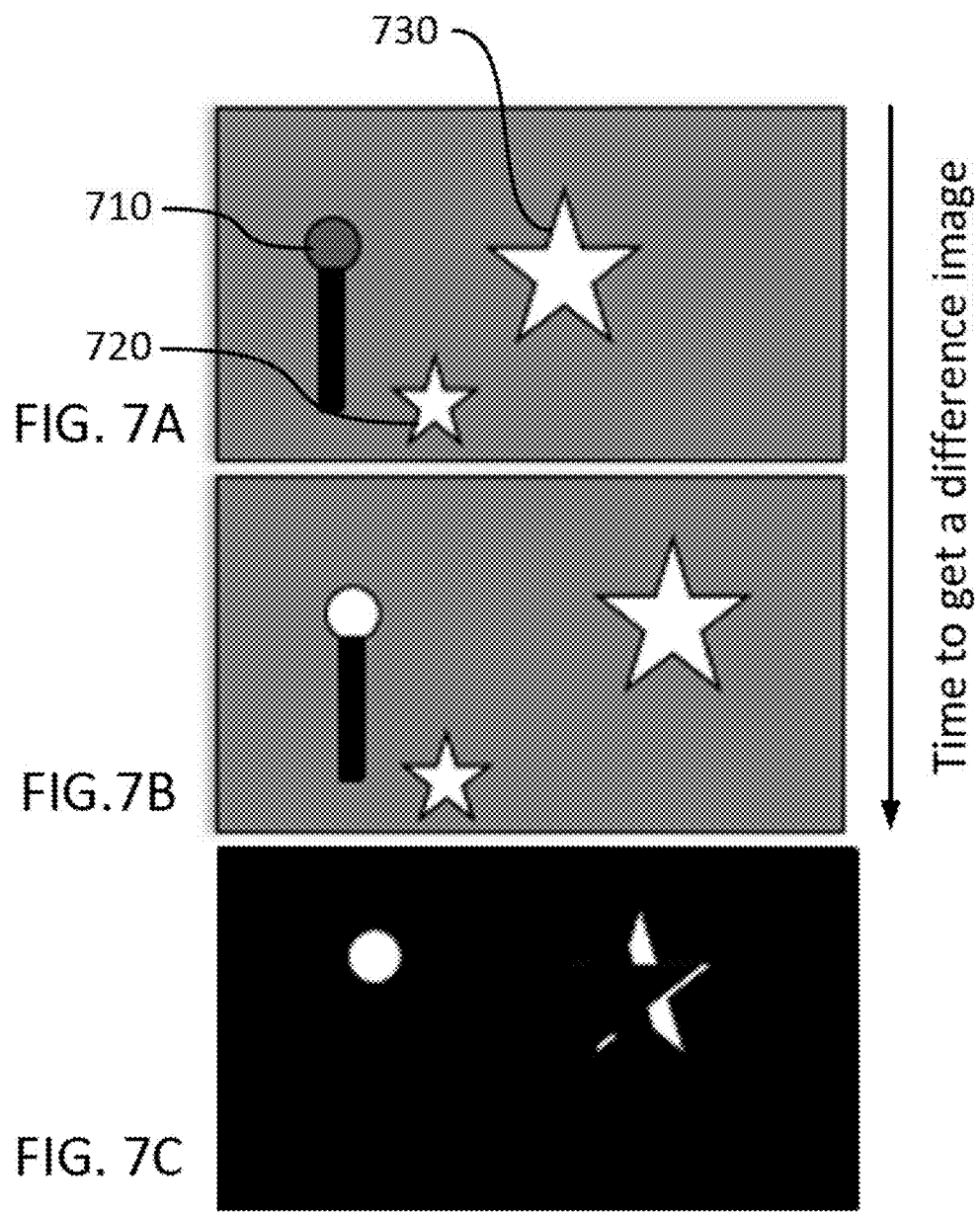
FIGS. 7A-7C illustrates an example of obtaining a difference image.

The subtraction of a full second image from a full first image, or vice versa, is qualitatively illustrated in FIGS. 7A-7C. In FIG. 7A, the imaging region recorded a scene without illumination so that a target can hardly be seen. In detail, the first image in FIG. 7A shows a target 710 (in gray), one bright fixed reflex 720 (small star) and one bright moving reflex 730 (big star). In FIG. 7B, the imaging region recorded a scene with illumination so that the target 710 can be clearly seen. Further, in the second image shown in FIG. 7B, the big star 730 moved, because the second image is taken after the first image. FIG. 7C shows the difference image, in which the real target and an artefact target caused by the time delay and associated movement of the big star can be recognized. The difference image is obtained by subtracting the pixels of the two images taken by the imaging region, which correspond to the same position, i.e. the pixel values are subtracted from each other which have recorded the same or similar parts of the scene. As becomes evident from FIGS. 7A and 7B, the second image taken with illumination on may also be taken before the first image or vice versa. That is, the difference image can be obtained independent of the sequence of subtraction.

Hence, from FIGS. 7A-7C it becomes clear that the artefact target in FIG. 7C should get eliminated if the time between taking images could be reduced. To achieve this, only an image section is read out in FIGS. 8A and 8B.

Figures 8A, 8B, 8C:
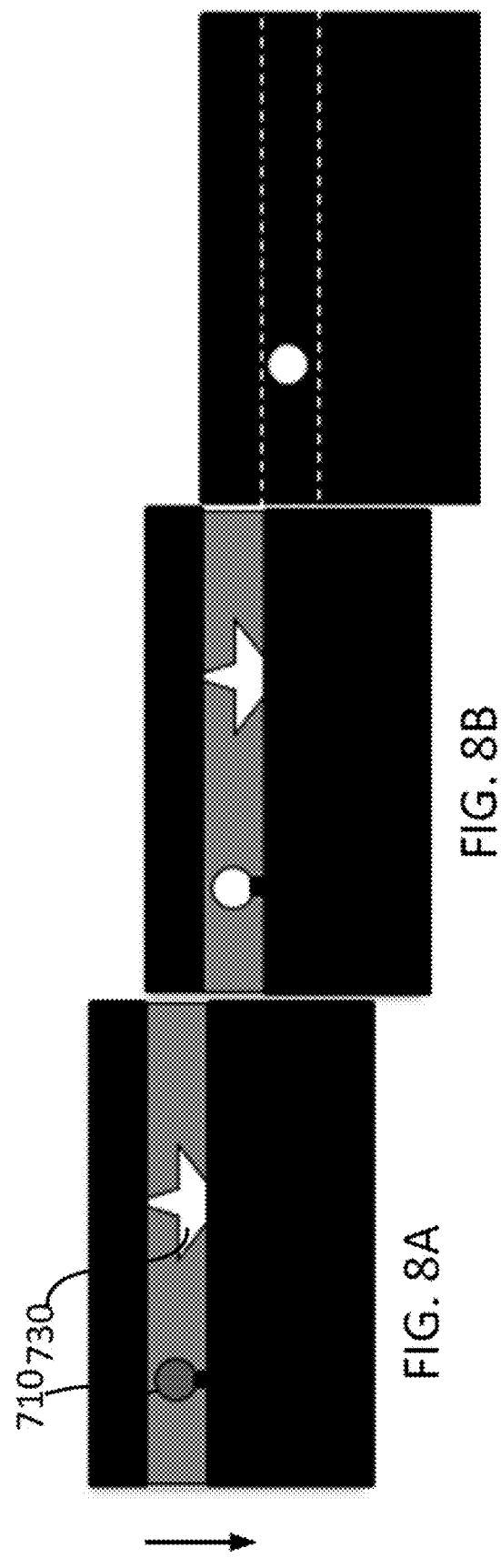
FIGS. 8A-8C illustrates schematically an embodiment of obtaining a difference image section.

In FIGS. 8A and 8B two images of the same scene as before are taken but using a stripe window allows a shorter time delay between taking the images. In FIG. 8A, the imaging region recorded the scene without illumination so that the target can hardly be seen. In more detail, the read out first image section in FIG. 8A hardly shows the non-illuminated target 710 (in gray) and a part of the bright moving reflex 730 (big star). In FIG. 8B, the imaging region recorded the scene with illumination so that the target can clearly be seen in the read out second image section. But also a part of the bright moving reflex 730 is seen in FIG. 8B, which due to the much shorter time delay just slightly moved compared to FIG. 7B.

FIG. 8C shows the difference image section, in which only the real target and not anymore an artefact target can be recognized. In detail, the difference image section is obtained by subtracting the pixels of the two image sections taken by the imaging region, which correspond to the same positions, i.e. the pixel values are subtracted from each other which have recorded the same or similar parts of the scene. As becomes evident from FIGS. 8A and 8B, the second image taken with illumination on may also be taken before the first image or vice versa. Since the target can only be seen clearly in the image section with illumination on and the rest including the reflex 730 of the scene (basically considered noise) is roughly the same in both image sections, the result of the subtraction is an image section including the clear real target, independent of whether an image with illumination on and then an image with illumination off is taken, or vice versa.

Compared to taking two images with one complete imaging region (whole image) and reading out the complete imaging region before taking a second image, the time to take a second image can be drastically shortened when only reading out a first image section. This particularly reduces the risk that the scene changes between two images/exposures which could lead to the difference image including artifacts. For example, a car may drive through the scene or the scene may change if the tracker is moved recording a different scene in the second image compared to the first image. Accordingly, the sensitivity in detecting and tracking a target is increased, since, for example, bright or reflecting surfaces which could be confused with a target can be largely eliminated when using the difference image section. As a result, tracking can be performed more reliably decreasing target losses when tracking a target and decreasing the time in finding a target. For example, only the read out time for the first image section and time of flight of the tracking light (negligible) may be between taking the two images.

Moreover, even if the time between taking the first and the second image is short and the tracker moves in that time, the controller 420 may further correct for the movement of the tracker in the short time between taking the first image and the second image by taking into account an offset between the scene on the stripe window of the first image and the scene on the stripe window of the second image which will be discussed further below with respect to FIGS. 11A-11E.

As mentioned above, the image sensor arrangement 410 has an imaging region 415 composed of a plurality of pixels arranged in a matrix of columns and rows. In a preferred embodiment, the imaging region of the image sensor arrangement has more pixels in the direction of the rows than in the direction of the columns. Further, the imaging region may be arranged in the tracker so that the direction of the rows corresponds to the vertical direction, i.e. a vertical direction of the observed scene, which can be achieved by rotating the imaging region by 90°. Generally, the vertical direction may be considered a direction approximately corresponding to the plumb-vertical of a Cartesian coordinate system. After rotation, if the rows are considered to be vertically aligned and columns horizontally aligned, the rectangular pixel array or matrix provides a portrait format. In one example, a conventional camera sensor can be used in a tracker as image sensor arrangement having a landscape format, wherein the camera sensor is rotated by 90° in the portrait format and arranged in the tracker.

Figure 9B:
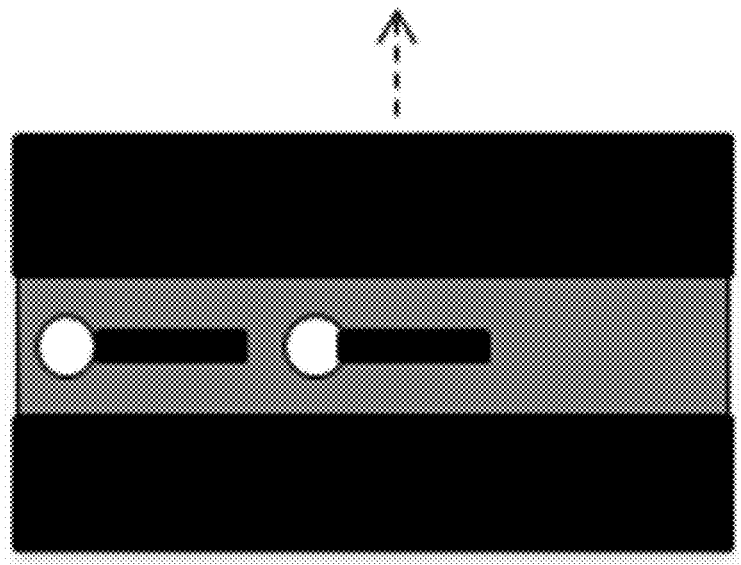
FIGS. 9A-9B illustrates an embodiment in which an image sensor chip is rotated.
Figure 9A:
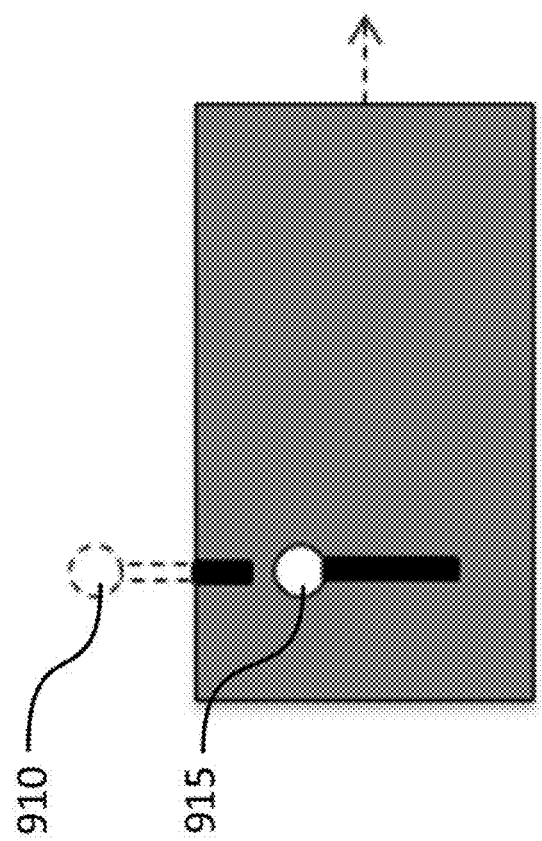

This principle is illustrated in FIGS. 9A and 9B in which the imaging region of FIG. 9A is rotated and the result is shown in FIG. 9B. In FIG. 9B, the stripe window is aligned vertically (not anymore horizontally as shown in FIGS. 8A-8C) which enables a larger vertical field of view, in the example of the above-mentioned wide-VGA CMOS Digital Image Sensor approximately 1.5-times larger. In FIGS. 9A and 9B, the two targets 910 and 915 can be found in the stripe window of FIG. 9B but not in the image of FIG. 9A. Therefore, when scanning the scene for targets by turning the tracker one turn in horizontal direction (most of the targets are placed usually in or close to the horizon) the observed vertical field of view is thus larger and more targets can be found within the same time (time needed for the turn). More importantly, the larger vertical field of view may thus make it unnecessary to turn the tracker a second time by one turn at a larger angle with respect to the horizon.

Image sensors usually have one direction of fast read out. For example, the above-mentioned wide-VGA CMOS Digital Image Sensor having a landscape format has a direction of fast read out of the sensor corresponding to the rows, here the horizontal direction, but can be rotated by 90° so as to be used as an image sensor arrangement allowing quick read out of the pixels along the subgroup of neighboring rows.

The number of columns or rows of a subgroup defining the size of the stripe window is between one column or row to half of all columns or rows, preferably a twentieth to a third of all columns or rows, and more preferably a tenth to a fifth of all columns or rows of the imaging region, wherein a full image or image frame corresponds to all columns or rows.

In one modified embodiment of the tracker, the size of the stripe window may be flexibly selected. For example, in a target search mode a stripe window of a first size is used and in a target tracking mode a stripe window of a second size is used, the first size and the second size being different. If the first size has more columns or rows than the second size, the difference image sections can be obtained quicker in the target tracking mode than in the target search mode. Thus, once a target is found in the search mode, it can be quickly tracked.

In one embodiment described with respect to FIGS. 10A-10E the controller 420 determines the position of the target inside the stripe window, and if the determined position of the target does not coincide with a position on the center line of the stripe window, the stripe window is enlarged and/or is shifted in the imaging region and/or the image sensor arrangement is mechanically moved so that the target is positioned closer to the center line. Here, closer to the center line means that the target should optimally be positioned on the center line but in practice, it should be enough to shift the stripe window so that the target remains detectable therein. The center line may be defined as a theoretical line which has the same distance to the two outer long sides (dashed lines) of the stripe window, wherein the width of the center line may be chosen to correspond to $\frac{1}{10}$ of the width of the matrix, i.e. in this example $\frac{1}{10}$ of all rows of the imaging region. Accordingly, the center line only needs to define an approximate center of the strip window and may vary in width depending on the width of the strip window.

Figure 10E:
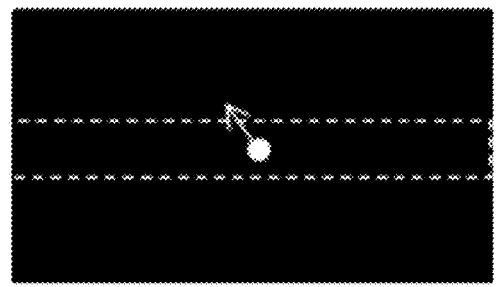
FIGS. 10A-10E illustrates an embodiment in which a stripe window is shifted.
Figure 10D:
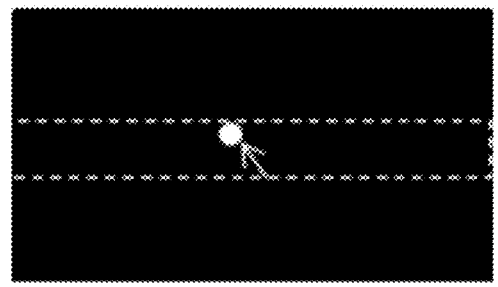
Figure 10C:
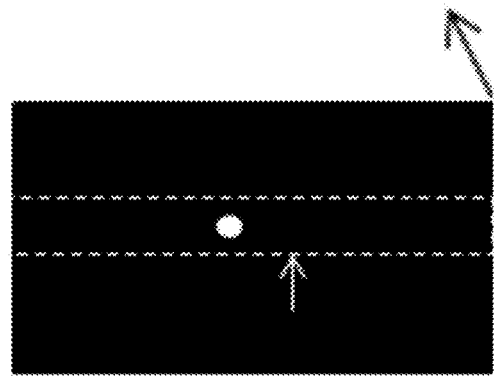
Figure 10B:
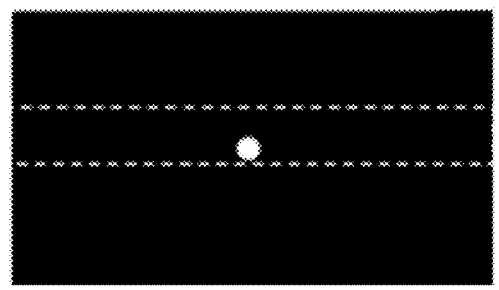
Figure 10A:
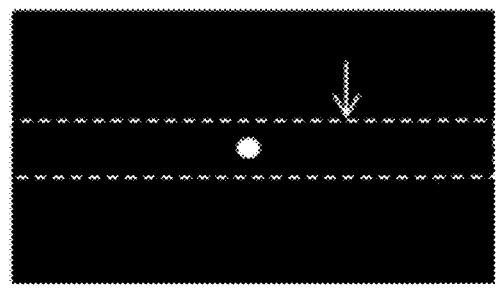

In detail, FIGS. 10A-10E illustrate multiple difference image sections explaining the stripe window shift principle. The strip window is indicated by the white dashed line. In FIG. 10A, the difference image section shows one target in the middle of the imaging region and the stripe window. In FIG. 10B, the next difference image section, the target moved in space and does not coincide anymore with a position on the center line of the stripe window. This movement may be small enough to not affect the subtraction of pixel values of two quickly read out image sections to calculate the difference image sections shown in FIGS. 10A and 10B but may become visible when waiting a longer time period between taking two pairs of image sections, the pair used for FIG. 10A and the pair used for FIG. 10B.

FIG. 10C shows a third difference image section where the position of the stripe window was electronically shifted so as to put the target back in middle of the stripe window so that the stripe window is not anymore in middle of the imaging region. That is, the position of the stripe window was electronically shifted inside the full camera frame (imaging region) according the detected position of the target inside the current stripe window. For example, if the target is out of the middle position of the stripe window the window position for the next pair of image sections used to obtain a difference image section will be set to a calculated best fitting position. This position change can be immediate and valid for the next pair of image sections. Then, the real position of the target regarding the old stripe window position is corrected by using the known new to old stripe window position shift.

For example, as shown in FIG. 10D, the tracker was moved from previous FIG. 10C so that the target is brought back again to the middle of the imaging region but at the left side of the stripe window. Then, as shown in FIG. 10E, the stripe window is shifted back to the middle position. Therefore, this method avoids loss of target caused by the inertia of the mechanically moving tracker.

As outlined above, it is always desired to keep the target within the strip window. Accordingly, the strip window may be shifted in the imaging region and/or the image sensor arrangement of the tracker may be mechanically moved so that the target is positioned closer to the center line. Another alternative or additional way to keep the target in the stripe window is to enlarge the stripe window which increases the area in which the target can be detected but on the other hand increases the time needed to read out the larger image sections. Hence, there is a tradeoff between detection area and read out time.

Above in FIGS. 10A-10E it may be assumed that the tracker does not move when taking a pair of images for calculating a difference image section, thus performing image acquisition in a "stop-and-go" mode. However, even if the tracker were moved slowly when taking two image sections, the two image sections may still cover roughly the same pixels, since image acquisition may be performed much faster than conventionally.

In the next embodiment discussed with respect to FIGS. 11A-11E, images are taken while the tracker moves continuously.

Therefore, according to this embodiment, the controller 420 can correct for this continuous movement. In more detail, after reading out two subgroups of neighboring rows constituting two stripe windows to obtain a pair of image sections from two images, the controller 420 corrects for a movement of the tracker in the time between taking the two images by taking into account an offset between the scene on the first stripe window of the first image and the scene on the second stripe window of the second image. This offset corresponds to a shift in the scene due to the movement of the tracker. However, since the movement speed and direction of the tracker are known, the shift in the scene can be calculated and corrected for. Thus, the difference image section can be calculated accurately.

Figure 11E:
FIGS. 11A-11E illustrates an embodiment in which a usable area in a stripe window is extracted.
Figure 11D:
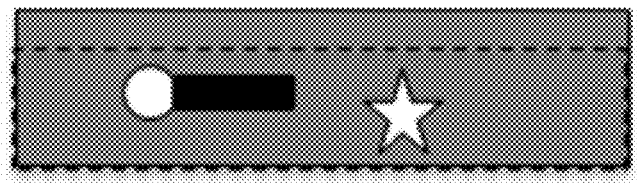
Figure 11C:
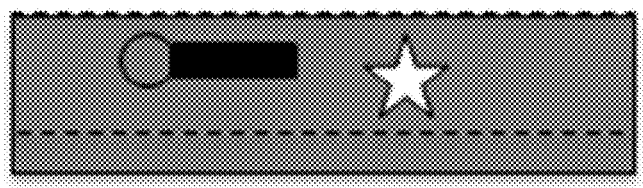
Figure 11B:
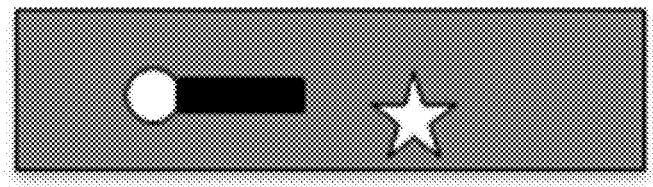
Figure 11A:
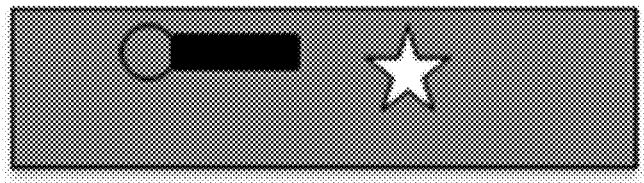

As can be seen in FIGS. 11A-11E, if the target is kept roughly in the middle of the image section, it is possible to account for the offset by electronically shifting the scene. FIG. 11A illustrates an image section showing a scene with a fixed target and fixed bright reflex and FIG. 11B illustrates a second image section showing the same scene but shifted due to the continuously turning of the tracker, wherein in the shifted scene the target is illuminated. For example, if the scenes recorded in the image sections in FIGS. 11A and 11B do not fully match (e.g. parts of the scene on the left side of the first image section are not present anymore in the second image section due to movement of the tracker to the right) but only three quarters of the pixel rows on the right side of the first image section (see dashed rectangles in FIGS. 11C and 11D) match three quarters of the pixel rows on the left side of the second image section, it is sufficient to subtract only three quarters of the image sections to obtain the target in FIG. 11E. Hence, in both image sections the same integer of pixels (one quarter of all pixels of the image section) is not used to calculate the difference image section.

In more detail, the calculated shifted areas shown as dashed rectangles in both image sections in FIGS. 11C and 11D depend on the turning speed (angle per time) and optical magnification (camera pixels per angle). Since the speed and magnification at which the scenes were taken (with and without illumination) are known, the subtraction of only parts of the image sections can be performed very accurately. In FIG. 11E, a difference image of only parts of the image sections is obtained due to the shift. However, although the effective field of view in turning (horizontal) direction is smaller (in the above example three quarters of the image section), it is free of movement effects. Since the read out time is decreased a lot by using only pixels within a stripe window, the shift is much smaller than for full image read out methods and can be calculated precisely. Thus, movement effects in the difference image sections are corrected and time losses caused by a stop and go mode are eliminated.

Another way of correcting for the movement of the tracker, if the speed and magnification are not readily known, is discussed in the following. In this embodiment, the controller 420 identifies an area of pixels of the first stripe window and another area of pixels of the second stripe window which correspond to the same scene. This may be carried out by using image processing to find corresponding features in the image sections so that areas showing the same scene can be identified (e.g. by auto correlation). Accordingly, a difference area can be obtained by determining a difference between the pixel values of the pixels of the two areas which recorded the same scene.

According to an embodiment, a method for tracking a target, for example, with the above described tracker 400, comprises taking an image of a scene including the target on an imaging region of an image sensor arrangement, which is composed of a plurality of pixels arranged in a matrix of columns and rows; and taking another image of a scene including the target on the imaging region. When receiving or generating a timing signal indicating a time duration during which an illumination unit illuminating the target in the scene is switched on and off, the imaging region is controlled to take the image of the scene when the timing signal indicates that the illumination unit is switched on (or off), and reading out a subgroup of neighboring columns or rows constituting a stripe window of the imaging region so that an image section including the target is obtained, and the imaging region is further controlled to take another image of the scene when the timing signal indicates that the illumination unit is switched off (or on), and reading out another subgroup of neighboring columns or rows constituting another stripe window of the imaging region so that another image section including the target is obtained. The method further comprises calculating a difference image section by determining a difference between the pixel values of the pixels of the image section and the other image section, and outputting the difference image section so as to identify the target in the difference image section.

The tracker 400 of FIG. 4 can be incorporated in different surveying apparatuses. For example, in FIG. 2 the tracker of FIG. 4 is incorporated in tracker 230 as tracker receiver 236. The image sensor arrangement is comprised in the tracker receiver 236 including an imaging region (see hatched area). The tracker further comprises the tracker emitter 237. Back-reflected tracking light is received through beam splitter 250 which is discussed in more detail below. A similar optical arrangement is also shown in FIG. 3 where elements 337 and 336 correspond to elements 237 and 236.

For the tracker of FIG. 4 it does not matter whether the tracker emitter is placed next to the tracker receiver (see e.g. FIG. 5) or placed at one end of the lens arrangement 110 (see e.g. FIG. 2), for example, and may constitute a ring of LEDs around an opening of the lens arrangement. Indeed, instead of a tracker emitter, such as emitters 537 or 237, emitting light to be reflected at the target, the target itself may include an illumination unit so that the target may be an active target receiving the timing signal to turn on or off the illumination unit.

Figure 2:
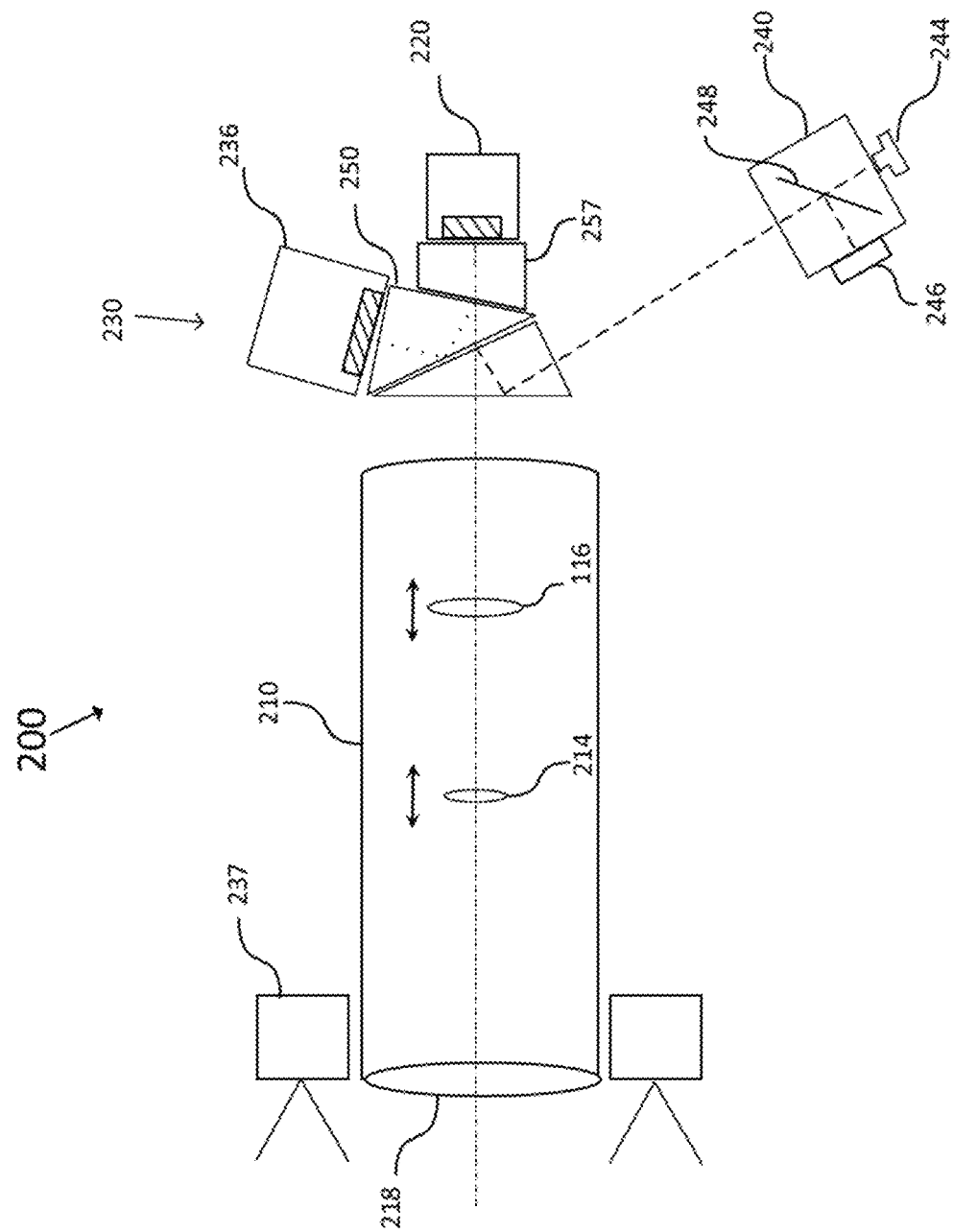
FIG. 2 illustrates a detailed embodiment of a surveying apparatus.
Figure 3:
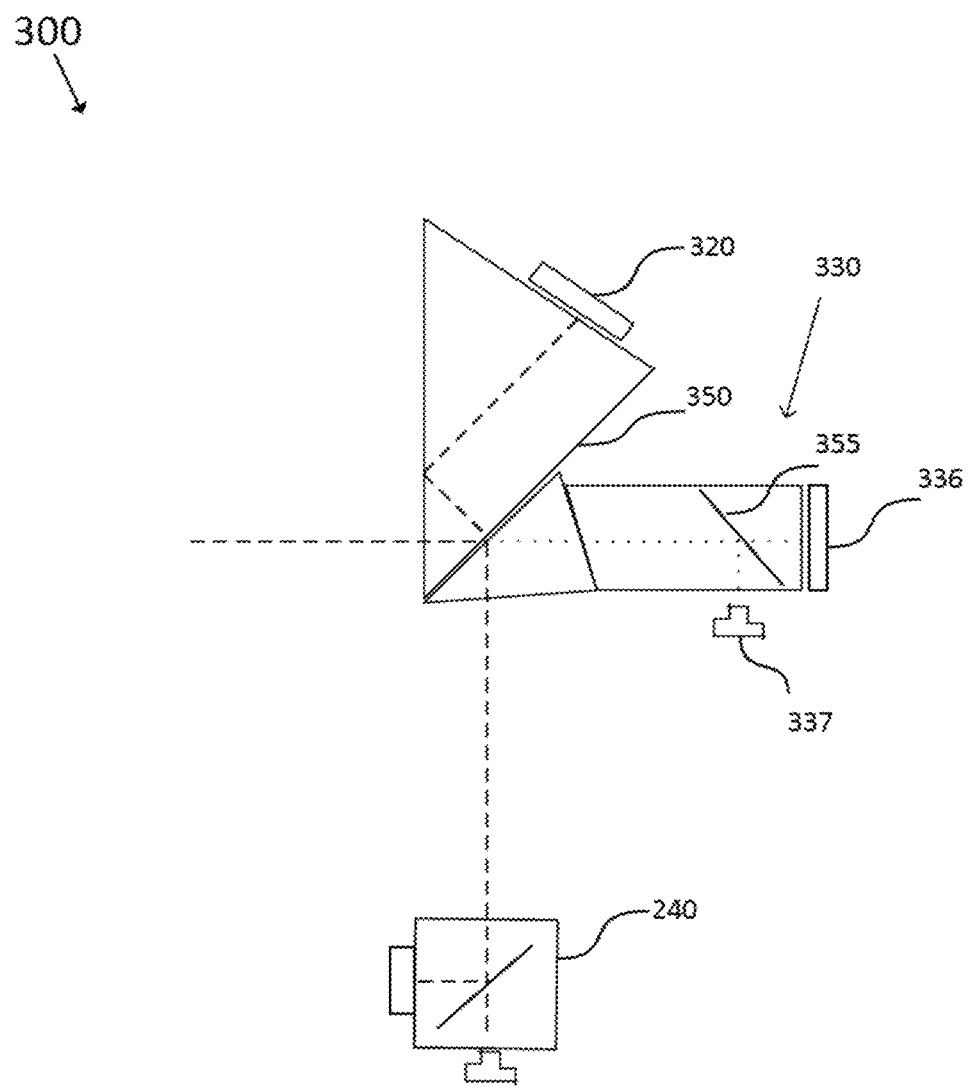
FIG. 3 illustrates a part of a surveying apparatus having an alternative arrangement of functional modules.
Figure 5:
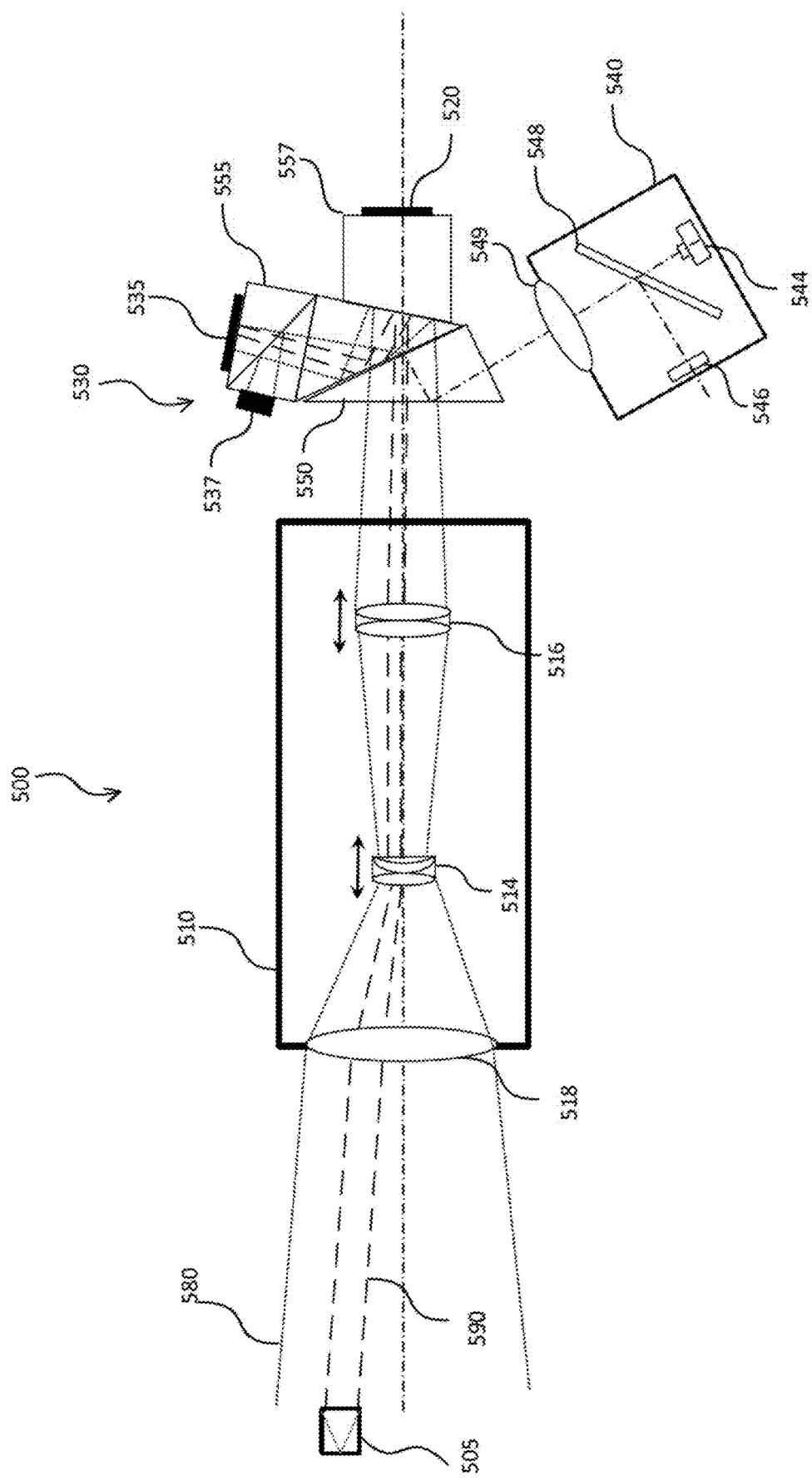
FIG. 5 illustrates a specific embodiment of a surveying apparatus including a tracker and an optical tracker path.

The tracker 400 can be used in the apparatuses shown in FIGS. 1B, 1C, 2, 3 and 5, whereas FIGS. 2, 3 and 5 are discussed in more detail in the following.

FIG. 2 illustrates a detailed embodiment of a surveying apparatus 200. The surveying apparatus 200 is a detailed example of surveying apparatus 100A, 100B, 100C. Hence, the elements, and particularly details thereof, discussed with respect to FIG. 2 can be combined with elements of the surveying apparatuses 100A, 100B and 100C and vice versa.

In FIG. 2, details of the lens arrangement, tracker, imaging unit and distance measuring unit shown in the previous figures are discussed by referring to lens arrangement 210, tracker 230, imaging unit 220 and distance measuring unit 240.

The lens arrangement 210 is depicted with a housing and a front opening 218. The opening 218 may comprise a fixed final focus lens on the optical axis of the lens arrangement. Further, the lens arrangement 210 comprises the focus lens element 116, which may be a compound lens or an individual lens having preferably a convex side facing the beam splitter/combiner 250. The focus lens element is arranged to be movable in the direction of the optical axis so as to provide different focus settings to sight an object.

The zoom lens element 214 may also be a compound lens or an individual lens and is arranged to be movable in the direction of the optical axis. The zoom lens element 214 is adapted to zoom. In other words, changing the position of the zoom lens element, leads to a change in the field of view. The focus lens element 116 and the zoom lens element 214 form a zoom optic and can be moved by drives. In particular, the lens arrangement is configured to maintain a magnification ratio so that an image size of the object on the imaging unit 220 is maintained constant. This may be achieved by driving the movable focus lens element 116 and the zoom lens element 214 accordingly.

Fixing the zoom optic to a constant magnification ratio has the advantage that objects, such as reflectors, have the same size simplifying image processing. For example, an object of 1 cm in the field has the same number of pixels in an image independent of whether it is at a distance of 10 m or 40 m.

Similarly, for outgoing light, e.g. distance measuring light of the distance measuring unit 240, the spot size of the outgoing laser light has always the same size on the object.

Further, moving the lens elements 214, 116 depending on each other reduces the calibration effort.

The lens arrangement 210 is further configured to switch between a narrow field of view and a wide field of view. For example, by adjusting the position of the zoom lens element 214 the field of view obtainable by the lens arrangement can be changed. A wide field of view may be used to obtain an overview image of a scenery in which the object can be easily found and measured and/or tracked, while a narrow field of view may be used for taking a distance measurement. For example, the wide field of view can be used to obtain panoramic images in which measurement points can then be defined. Another advantage of panoramic images is that the images can be used to remotely control the surveying apparatus by viewing the images at a position remote to the surveying apparatus.

The beam splitter/combiner 250 in FIG. 2 is the same one as described with respect to FIGS. 1A, 1B and 1C and may comprise two prisms glued together. In another example, there may be an air gap between the two prisms. In addition to the previous embodiments, interfaces to the functional modules 220 and 230 are shown in more detail. For example, the additional prism element 257 which may form part of the prism system is provided to achieve a good optical connection to the imaging unit 220. In this example, the imaging unit 220 is an electronic imaging device having a camera chip, such as a CCD, which can be glued to the prism element 257. This reduces the need of additional mechanical components for positioning, adjusting and/or fixing the electronic imaging device to the additional prism element. The additional prism element 257 may also be glued to the beam splitter/combiner 250 so as to form a compact unit which should not require any optical adjustments even if mechanical shocks are applied.

The tracker channel of the multi-channel prism system 250 is indicated by a dotted line showing an approximation of the optical axis of the tracker 230. The tracker 230 comprises a tracker receiver 236 which may be realized by a camera chip schematically illustrated as hashed rectangle. One example of a tracker emitter is illustrated with reference sign 237. This tracker emitter may be made up of LEDs arranged in a ring surrounding the front opening 218 forming an LED array, which is located away from the tracker 230. These light-emitting diodes (LEDs) may emit infrared light in the same direction as the optical axis of the lens arrangement 210. Tracking light reflected from the object is then received in the lens arrangement 210 and split by the beam splitter/combiner 250 to follow the optical tracker path before being incident on the tracker receiver 236.

Accordingly, images of tracking light reflected by an object and received by the surveying apparatus are obtained sequentially. In the same way as discussed with respect to the additional prism element 257, the camera chip of the tracker receiver can be glued to the beam splitter/combiner 250.

In one embodiment, a first image may be acquired when the tracker emitter 237 is on and illuminates the object and a second image may be acquired shortly after when the tracker emitter 237 is off. In the same way, the first image may be acquired when the tracker emitter 237 is off and the second image may be acquired shortly after when the tracker emitter 237 is on and illuminates the object. As discussed in detail above with respect to FIGS. 4, 8, 10 and 11 by reading out image sections and subtracting the image sections a difference image section of the tracking light reflected at the object can be derived.

The distance measuring unit 240 in FIG. 2 shows a detailed example of the distance measuring unit 140 comprising a laser 244 and a detector 246 in the same module and having the same optical path for the laser emitter and detector. The laser may emit light in the red, as discussed with respect to FIG. 1A, or in the infrared wavelength range. The laser of the distance measuring unit 240 is adapted to emit laser light which is reflected by the beam splitter/combiner 250 so as to be output coaxially to the optical axis of the lens arrangement.

As schematically illustrated in FIG. 2, the laser light may follow the dashed line first passing the apertured mirror 248 (a.k.a. pinhole mirror) and then entering the beam splitter/combiner 250 where it is twice reflected before being outputted to the lens arrangement 210. After passing the two lenses elements 116 and 214 the focused laser light exits at the front opening 218 and is then reflected by an object (not shown).

The reflected laser light again passes through the lens arrangement 210, is reflected twice in the beam splitter/combiner 250 and is incident on the apertured mirror 248 in the distance measuring unit 240. Alternatively, a beam splitter instead of the aperture mirror (a highly reflective mirror with a pinhole to allow the laser light going through) can be used. This beam splitter may be a 50:50 beam splitter and parts of the reflected laser light are then detected on the detector 246. The detector 246 may be an avalanche photodiode.

Once the detector detects back-reflected measuring light, a controller of the surveying apparatus may use know methods, such as a pulse method or phase method, to perform a distance measurement.

FIG. 3 illustrates a part of the surveying apparatus 100A, 100B, 100C, 200 having an alternative arrangement of functional modules.

The beam splitter/combiner 350 again comprises two wedge shaped prisms which, however, are arranged differently to beam splitter/combiner 250 so that also the optical paths are different. In FIG. 3 the imaging/visual channel is located on the top and the visible light coming from the lens arrangement needs to be reflected twice to reach the imaging unit 320. The tracker 330 is again constituted by tracker receiver 336 but comprises now a tracker emitter 337 next to the tracker receiver so that the LED ring as tracker emitter 237 can be omitted. Tracking light is transmitted from the tracker emitter to the beam splitter 355 then reflected by the target (object) and passes through the prism and beam splitter to the tracker receiver 336. Since the tracking light of the tracker emitter 337 passes through the lens arrangement and its lenses, the light can be focused on the object so as to receive a stronger reflection back compared to the case of the tracker emitter 237. However, providing an additional beam splitter, as shown in FIG. 3, to arrange the optical axes of the tracker receiver and the tracker emitter on the same optical axis as the lens arrangement introduces more optical components and thus more complexity. The distance measuring unit 240 is the same as in FIG. 2.

FIG. 5 illustrates a specific embodiment of a surveying apparatus 500 including details of the lens arrangement, tracker, imaging unit and distance measuring unit shown in the previous figures and referred to as lens arrangement 510, tracker 530, imaging unit 520 and distance measuring unit 540 in the following.

Specifically FIG. 5 shows an optical path 580 of the tracker (optical tracker path) by the dotted line passing the edges of the lenses in the lens arrangement 510 including the final focus lens 518, the zoom lens element 514 represented as compound lens, and the focus lens element 516 represented as compound lens, wherein the focus lens element 516 is movably arranged between the final focus lens and the beam splitter/combiner.

The optical tracker path 580 is further indicated in the prism system 550 having multiple reflections at the surfaces and further indicated in the beam splitter cube 555 to which the tracker emitter 537 and the tracker receiver 535 is attached in this example. The optical tracker path 580 can be filled with light from the tracker emitter 537, e.g. comprising one or more infrared (IR) LEDs or an infrared laser at approximately 850 nm. When the tracking light exits the lens arrangement 510 and hits the object 505, which is preferably a reflector made of a triple prism in this example, the reflected light enters again the lens arrangement 510 as a light beam reflected from the target. This light beam is indicated by the dashed line 590. Reflections of this dashed line in the prism system and the position where the light beam hits the tracker receiver 535, e.g. an IR camera chip, is also illustrated in FIG. 5.

In FIG. 5, the tracker 530 has a tracker with the functionality of tracker 400. In another example, tracker 530 may be replaced by tracker 230 or 330 as illustrated in FIGS. 2 and 3, respectively. In the first case, the tracker emitter is preferably adapted as discussed with respect to tracker emitter 237, e.g. as an LED ring. For the tracker 400, it does not matter whether the tracker emitter is placed next to the tracker receiver (see e.g. FIG. 5) or placed at one end of the lens arrangement 110 (see e.g. FIG. 2).

Additionally, the reflector 505 and its surroundings may be imaged by the imaging unit 520 which receives visible light through the imaging channel comprising the optical element 557.

The distance measuring unit 540 is discussed in the following. Similar to the distance measuring units 140 and 240, the distance measuring unit 540 comprises a laser 544 and a detector 546. The distance measuring unit 540 is adapted to emit laser light from the laser 544 which passes through the beam splitter 548 and the lens 549 before being incident on the beam splitter/combiner 550. The laser wavelength may be in the red wavelength range, such as 635 nm, and the beam splitter/combiner 550 is adapted to reflect the laser light so as to overlap with the optical axis of the lens arrangement 510 when exiting the beam splitter/combiner 550, illustrated as prism system in FIG. 5.

Therefore, the laser light must pass several optical elements 548, 549, 550, 516, 514, 518 before being reflected by the reflector 505. Hence, back-reflected light may be detected not only from the reflector 505 but also from the other optical elements which could lead to the wrong assumptions regarding the distance to the reflector 505.

In detail, the time of flight of a laser pulse from the laser 544 to the reflector 505 may be used to measure the distance and if one of the several optical elements of the surveying apparatus also provides a reflection which can be detected by the detector 546, the distance measurement result may not be reliable. Therefore, care has been taken to avoid any undesired (multipath) reflections. For example, lens elements 549, 516, 514 and 518 are provided with anti-reflection coatings. Further, the lens element 549 may be chosen such that it focuses the laser light emitted by the laser 544 on an intermediate focus between the lens element 549 and the lower surface of the beam splitter/receiver 550 on which the laser light is incident. In particular, it is desired to avoid an intermediate focus on the prism surface facing the distance measuring unit 540 which could lead to strong back-reflections. Furthermore, this prism surface may be provided with an anti-reflection coating as well.

Additionally, the right lens of the focus lens element 516, i.e. the lens facing the beam splitter/combiner 550, has a convex side facing the beam splitter/combiner 550. This lens may be a plano-convex or a bi-convex lens, as shown. As a result, reflections from this lens of distance measuring light from the distance measuring unit 540 may not easily reflect back into the distance measuring unit 540 and reach the detector 546. Therefore, crosstalk which could lead to the detections of signals not coming from the actual target can be largely avoided.

Crosstalk can further be suppressed by the optical design and orientation of the prism system 550 and the lens groups 514 and 516. For example, the surfaces of the prism system 550 on which light is incident can be slightly tilted with respect to an orthogonal direction so that light is not fully orthogonally incident thereon. Furthermore, air gaps between individual prisms for total reflection can be provided where appropriate.

According to the above, there are several challenges when guiding the laser light of the distance measuring unit 540 through the prism system 550 and the lens arrangement 510 which have hindered the skilled person to consider such a coaxial alignment. By taking care of undesired back reflections, as outlined in the examples above, and by intelligently processing back-reflected light detected by the detector 546, the risk of unreliable measurement results can be mitigated.

For intelligent processing detected light, the surveying apparatus may comprise a controller. The controller, such as controller 608 of FIG. 6, may apply an electronic gating method, e.g. ignoring detected back reflections which are received very shortly after the laser pulse has been emitted so that only reasonable distances to an object of more than 2 m are considered, for example. In particular, the controller may be programmed to ignore detected back reflections which lead to a distance below a predetermined threshold value, e.g. 2 m.

The functions of controller 608 may be distributed over the individual units of the surveying apparatus 600. In particular, the control function of the electronic gating method may be provided directly in the distance measuring unit 640. Further, the functions of the controller 420 of tracker 400 of FIG. 4 may be provided in controller 608 so that the surveying apparatus 600 incorporating the tracker 400 as tracker 630 may comprise in one embodiment only one controller.

On the other hand, using the optical setup shown in FIG. 5, the performance of the distance measuring unit, the tracker and lens arrangement can be improved compared to simple bi-axial systems, in which the optical axis of the lens arrangement and the optical axis of the laser measuring unit do not overlap. In the surveying apparatus 500 of FIG. 5, when guiding the laser light of the distance measuring unit 540 through the prism system 550 and the lens arrangement 510, the optics of the lens arrangement can be controlled to focus the laser light on the reflector 505 which leads to a better signal-to-noise ratio when receiving back reflected light. Additionally, the focused laser spot on the reflecting object is smaller than without focusing so that a higher resolution of the object can be obtained.

Figure 6:
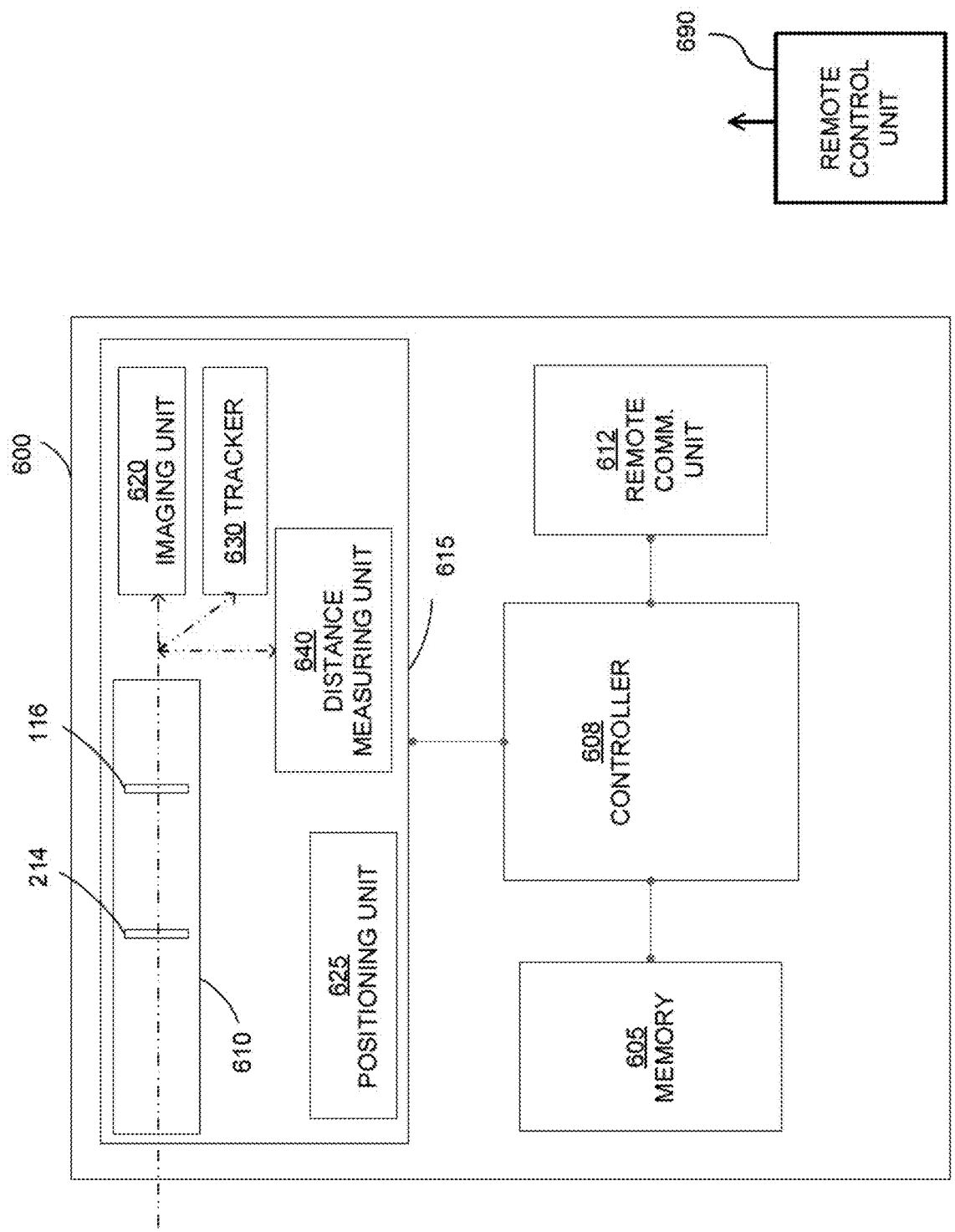
FIG. 6 illustrates elements of a surveying apparatus in a surveying system according to another embodiment emphasizing the communication and control between elements on a functional level.

FIG. 6 illustrates elements of a surveying apparatus 600 in a surveying system according to another embodiment emphasizing the communication and control between elements on a functional level. In addition to the surveying apparatus 600, the system may comprise the remote control unit 690 which can be used by an operator to control the surveying apparatus 690 or total station including such an apparatus.

The surveying apparatus 600 comprises an acquisition unit 615, a controller 608, memory 605 and remote communication unit 612 which may communicate with the remote control unit 690 to receive instructions therefrom.

The acquisition unit 615 may form a part of the head of a total station and comprises the lens arrangement 610 including the lens elements 214 and 116, the imaging unit 620, the tracker 630 and the distance measuring unit 640. Since the illustration in FIG. 6 is not concerned with the optical setup but explains the surveying apparatus 600 on a functional level, details about a prism system and the combination of different optical paths have been avoided and it is referred to the previous figures for details. The acquisition unit 615 further comprises a positioning unit 625 which is provided for adjusting the optical axis of the lens arrangement 610 relative to a reference axis, such as an axis of a polar coordinate system including a distance and two angles. For example, the positioning unit is realized by an electromechanical arrangement comprising preferably servo drives for precisely positioning the acquisition unit 615.

Accordingly, the positioning unit 625 may move the lens arrangement 610 to follow a moving object. In detail, when the optical arrangement 610 sights an object, the tracker 630 may track the sighted object. The tracker 630 may evaluate the movement of the object, e.g. in the controller 608, and may issue an instruction to the positioning unit 625 to move the optical axis of the lens arrangement. In this way, the head of the surveying apparatus or total station including the surveying apparatus may be moved to follow the object (target). As mentioned above, as tracker 630 the tracker 400 may be used and the control functions of controller 420 of the tracker 400 and the control functions of controller 608 of the surveying apparatus 600 may either be combined in one controller or may be distributed to different controllers, such as two controllers 420 and 608 which preferably are operatively coupled to communicate with each other.

Moreover, the control of the functional modules may constitute individual control elements controlling each module individually and being located close to or in the functional modules. The control elements may be realized by a hardware arrangement, such as hard-wired circuits or ASICs (application specific integrated circuits) or software or any suitable combination of the above. In particular, the control of the functions performed by the lens arrangement 610, the tracker 630, the imaging unit 620 and the distance measuring unit 640 may be realized by software.

In the surveying apparatus 600 of FIG. 6 individual control elements are combined in the controller 608. For example, a tracking control element, an imaging control element and a distance measuring control element may be realized by a processor running different software codes which may be stored in the memory 605.

Furthermore, the controller 608 may be configured to analyze the image of the object acquired by the imaging unit 620 and configured to issue an instruction to the lens arrangement 610 to move one or more lenses of the lens arrangement so as to maintain an image size of the object on the imaging unit constant and/or lens movement may be used for the autofocus. In the same way, the controller 608 may be configured to analyze the image of the object acquired by the tracker receiver of the tracker 630 and configured to issue an instruction to the lens arrangement 610 to move one or more lenses of the lens arrangement so as to maintain an image size of the object on the tracker receiver constant. Further, the controller 608 may be configured to analyze the back-reflected light detected by the detector of the distance measuring unit and calculate the distance to the object by considering the time when the laser pulse of the laser was emitted and the time when the back-reflected light was detected.

Although the tracker has been described in several embodiments in combination with a surveying apparatus, the tracker is not limited thereto, since the tracker may be useful for several other applications. For example, the tracker may be used to track an object without providing an image and/or distance to it.

It will be apparent to those skilled in the art that various modifications and variations can be made in the trackers and apparatuses of the invention without departing from the scope of or spirit of the invention.

The invention has been described in relation to particular examples which are intended in all respect to be illustrative rather than restrictive. Those skilled in the art will appreciate that many different combinations of hardware, software and firmware will be suitable for practicing the present invention.

Moreover, other implementations of the invention will be apparent to those skilled in the art from consideration of the specification and practice of the invention disclosed herein. It is intended that the specification and the examples be considered as exemplary only. To this end, it is to be understood that inventive aspect lie in less than all features of a single foregoing disclosed implementation or configuration. Thus, the true scope and spirit of the invention is indicated by the following claims.

The invention claimed is:

1. Tracker for tracking a target, comprising:
   an image sensor arrangement having an imaging region composed of a plurality of pixels arranged in a matrix of columns and rows; the imaging region being arranged to take an image of a scene including the target;
   a controller configured to:
      receive or generate a timing signal, the timing signal indicating a time duration during which an illumination unit illuminating the target in the scene is switched on and off,
      control the imaging region to take an image of the scene when the timing signal indicates that the illumination unit is switched on, and read out a subgroup of neighboring columns and rows constituting a stripe window of the imaging region so that an image section including the target is obtained, the subgroup of neighboring columns and rows having an unequal number of columns and rows,
      control the imaging region to take another image of the scene when the timing signal indicates that the illumination unit is switched off, and read out another subgroup of neighboring columns and rows constituting another stripe window of the imaging region so that another image section including the target is obtained, the another subgroup of neighboring columns and rows having an unequal number of columns and rows,
      calculate a difference image section by determining a difference between the pixel values of the pixels of the image section and the other image section, and
   an output unit configured to output the difference image section so as to identify the target in the difference image section.

2. The tracker according to claim 1, wherein the imaging region of the image sensor arrangement is adapted so that more pixels are arranged in the direction of the rows than in the directions of the columns and is arranged in the tracker so that the direction of the rows corresponds to a vertical direction.

3. The tracker according to claim 1, wherein the number of columns and rows of a stripe window is between one column or row to half of all columns or rows, and the number of columns and rows of the stripe window is between a twentieth to a third of all columns or rows of the imaging region.

4. The tracker according to claim 1, wherein in a target search mode a stripe window of a first size is used and in a target tracking mode a stripe window of a second size is used, the first size and the second size being different.

5. The tracker according to claim 1, wherein the controller is further configured to determine the position of the target inside the stripe window, and if the determined position of the target does not coincide with a position on the center line of the stripe window, the stripe window is enlarged and/or shifted in the imaging region and/or the image sensor arrangement is mechanically moved so that the target is positioned closer to the center line.

6. The tracker according to claim 1, wherein the controller is configured, after reading out the subgroup and the other subgroup of neighboring columns and rows constituting two stripe windows, when calculating the difference image section, to correct for a movement of the tracker in the time between taking the image and the other image by taking into account an offset between the scene on the stripe window of the image and the scene on the stripe window of the other image, the offset corresponding to a shift in the scene due to the movement of the tracker.

7. The tracker according to claim 6, wherein to correct for the movement of the tracker, the controller is configured to identify an area of pixels of the stripe window and another area of pixels of the other stripe window which correspond to the same scene so as to obtain a difference area by determining a difference between the pixel values of the pixels of the area and the other area which recorded the same scene.

8. The tracker according to claim 1, wherein the tracker comprises a tracker emitter for emitting tracking light on an optical tracker path.

9. The tracker according to claim 1, wherein the tracker is adapted to issue an instruction to a surveying apparatus to move an optical axis of a lens arrangement of the surveying apparatus.

10. Surveying apparatus for surveying a target, comprising
    a lens arrangement including at least one movably arranged focus lens element for focusing to sight a target;
    an imaging unit configured to obtain an image of at least a part of the target; and
    the tracker according to claim 1.

11. The surveying apparatus according to claim 10, further comprising
    a beam splitter/combiner configured to combine a part of an optical imaging path of the imaging unit and a part of an optical tracker path of the tracker so that an optical axis of the imaging unit and an optical axis of the tracker are at least coaxially arranged with an optical axis of the lens arrangement between the lens arrangement and the beam splitter/combiner.

12. The surveying apparatus according to claim 10, further comprising
a distance measuring unit configured to measure a distance to the target along an optical axis of the distance measuring unit.

13. The surveying apparatus according to claim 12, wherein the beam splitter/combiner is further configured to combine the part of the optical tracker path of the tracker, the part of the optical imaging path of the imaging unit and a part of an optical distance measuring path of the distance measuring unit so that the optical axis of the tracker, the optical axis of the imaging unit and the optical axis of the distance measuring unit are at least coaxially arranged with the optical axis of the lens arrangement between the lens arrangement and the beam splitter/combiner.

14. Method for tracking a target, comprising:
taking an image of a scene including the target on an imaging region of an image sensor arrangement, which is composed of a plurality of pixels arranged in a matrix of columns and rows; and
taking another image of a scene including the target on the imaging region;
wherein when receiving or generating a timing signal indicating a time duration during which an illumination unit illuminating the target in the scene is switched on and off,
the imaging region is controlled to take the image of the scene when the timing signal indicates that the illumination unit is switched on, and a subgroup of neighboring columns and rows constituting a stripe window of the imaging region is read out so that an image section including the target is obtained, the subgroup of neighboring columns and rows having an unequal number of columns and rows, and
the imaging region is further controlled to take another image of the scene when the timing signal indicates that the illumination unit is switched off, and another subgroup of neighboring columns and rows constituting another stripe window of the imaging region is read out so that another image section including the target is obtained, the another subgroup of neighboring columns and rows having an unequal number columns and rows, and the method further comprising:
calculating a difference image section by determining a difference between the pixel values of the pixels of the image section and the other image section, and
outputting the difference image section so as to identify the target in the difference image section.

15. A program including instructions adapted to cause data processing means to carry out the method of claim 14.

* * * * *